United States Patent
Hegde et al.

(10) Patent No.: US 12,483,464 B2
(45) Date of Patent: Nov. 25, 2025

(54) EXPEDITING CORRECTION OF WAN OR LAN TRAFFIC LOSS

(71) Applicant: HEWLETT PACKARD ENTERPRISE DEVELOPMENT LP, Spring, TX (US)

(72) Inventors: Sanjay Kaniyoor Surendra Hegde, Bangalore (IN); Krishna Nataraj Vadde Makkalla, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 388 days.

(21) Appl. No.: 18/161,304

(22) Filed: Jan. 30, 2023

(65) Prior Publication Data
US 2024/0259255 A1   Aug. 1, 2024

(51) Int. Cl.
*H04L 41/0654* (2022.01)
*H04L 43/10* (2022.01)
*H04L 43/12* (2022.01)
*H04L 47/125* (2022.01)

(52) U.S. Cl.
CPC .......... *H04L 41/0654* (2013.01); *H04L 43/10* (2013.01); *H04L 43/12* (2013.01); *H04L 47/125* (2013.01)

(58) Field of Classification Search
CPC ..... H04L 41/0654; H04L 43/10; H04L 43/12; H04L 43/0811; H04L 47/125
USPC ................................. 370/225, 228; 709/224
See application file for complete search history.

(56) References Cited

U.S. PATENT DOCUMENTS

| | | | |
|---|---|---|---|
| 9,049,106 B2 | 6/2015 | Regan et al. | |
| 9,559,962 B2 | 1/2017 | Durrani et al. | |
| 11,122,007 B2 | 9/2021 | Vadde et al. | |
| 11,134,126 B2 | 9/2021 | Theogaraj et al. | |
| 11,212,223 B2 | 12/2021 | Gupta et al. | |
| 11,223,514 B2 | 1/2022 | Mayya et al. | |
| 11,223,538 B1 | 1/2022 | Arumugam et al. | |
| 11,323,307 B2 | 5/2022 | Mayya et al. | |
| 11,374,791 B2 | 6/2022 | Vadde Makkalla et al. | |
| 2005/0036442 A1* | 2/2005 | Saleh ................ | H04L 45/28 398/1 |

(Continued)

FOREIGN PATENT DOCUMENTS

CN   106878048 A   6/2017
CN   107210934 A   9/2017

(Continued)

*Primary Examiner* — Jungwon Chang
(74) *Attorney, Agent, or Firm* — Sheppard Mullin Richter & Hampton LLP

(57) ABSTRACT

Systems and methods are provided for monitoring the accessibility to a network from the gateway device via a physical uplink and via a virtual uplink. For example, the system may mark a status of the physical uplink as reachable and a status of the virtual uplink as unreachable prior to completion of a WAN health check. The system may update a default gateway to the physical uplink and remove the virtual uplink so that the default gateway can use the physical uplink to maintain data transmissions to the network from the gateway device via the physical uplink and suspend or stop connections via the virtual uplink. The system can continue to monitor the accessibility to the network from the gateway device via the virtual uplink by listening for a tunnel heartbeat from the virtual uplink.

20 Claims, 18 Drawing Sheets

(56) References Cited

U.S. PATENT DOCUMENTS

| | | |
|---|---|---|
| 2006/0168192 A1 | 7/2006 | Sharma et al. |
| 2006/0193247 A1 | 8/2006 | Naseh et al. |
| 2006/0193252 A1 | 8/2006 | Naseh et al. |
| 2006/0268729 A1 | 11/2006 | Huang et al. |
| 2009/0154463 A1 | 6/2009 | Hines et al. |
| 2010/0271933 A1 | 10/2010 | Li et al. |
| 2010/0293408 A1* | 11/2010 | Shannon .............. H04L 41/08 709/224 |
| 2014/0169154 A1 | 6/2014 | Chen et al. |
| 2014/0317440 A1 | 10/2014 | Biermayr et al. |
| 2015/0263937 A1 | 9/2015 | Macchiano et al. |
| 2016/0013862 A1 | 1/2016 | Zhang et al. |
| 2016/0218953 A1* | 7/2016 | Lee ................ H04L 41/0895 |
| 2016/0248729 A1 | 8/2016 | Cui et al. |
| 2016/0277509 A1* | 9/2016 | Qiang .............. H04L 67/1001 |
| 2017/0123939 A1 | 5/2017 | Maheshwari et al. |
| 2017/0126564 A1 | 5/2017 | Mayya et al. |
| 2017/0308446 A1* | 10/2017 | Kanso .............. H04L 67/1001 |
| 2018/0026813 A1 | 1/2018 | Meulenhoff et al. |
| 2019/0140889 A1 | 5/2019 | Mayya et al. |
| 2019/0158314 A1 | 5/2019 | Choi et al. |
| 2019/0260610 A1 | 8/2019 | Dubey et al. |
| 2020/0036578 A1 | 1/2020 | Gupta et al. |
| 2020/0136946 A1* | 4/2020 | Janarthanan ........ H04L 43/0811 |
| 2021/0034429 A1 | 2/2021 | Krivenok et al. |
| 2021/0058284 A1 | 2/2021 | Chandramohan et al. |
| 2021/0238149 A1 | 8/2021 | Kember et al. |
| 2023/0164064 A1* | 5/2023 | Fahs ............... H04L 41/5009 370/228 |
| 2024/0259256 A1 | 8/2024 | Hegde et al. |

FOREIGN PATENT DOCUMENTS

| | | |
|---|---|---|
| CN | 108768817 A | 11/2018 |
| EP | 3487145 A2 | 5/2019 |

* cited by examiner

Datapath Session Table Entries

Flags: F - fast age, S - src NAT, N - dest NAT
       D - deny, R- redirect, Y - no syn
       H - high prio, P - set prio, T - set Tos
       C - client, M - mirror, V - VOIP
       Q - Real-Time Quality analysis
       u - Upstream Real-Time Quality analysis
       I - Deep inspect, U - Locally destined
       E - Media Deep Inspect, G - media signal
       r - Route Nexthop, h - High Value
       A - Application Firewall Inspect
       i - Session classified on first packet
       J - SDWAN Default Probe stats used as fallback
       f - FEC Enabled for the Session
       X - SDWAN Exception, x - Translation
       B - Permanent, O - Openflow
       L - Log, o - Openflow config revision mismatched
       Z - Session is redirected to IDPS

FIG. 13

| (9004-DC42) #show datapath session uplink \| include 8.8.8.8 | | | | | | | | | | |
|---|---|---|---|---|---|---|---|---|---|---|
| 8.8.8.8 | 172.33.192.1 | 1 2048 | 0 | 0 | local | e | 1 | 96 | ae6 | 0 | 192 | uplink192_inet |
| 172.33.192.1 | (0 ) N/A | Not-Classified | (0 ) | | | | | | | | |
| 8.8.8.8 | 8.8.8.8 | 1 1536 2048 | 0 | 1 | local | e | 1 | 120 | 1d63 | 80001 192 | uplink192_inet |
| 172.33.192.1 | (0 ) N/A | Not-Classified | (0 ) | | FCI | | | | | | |
| 8.8.8.8 | 172.33.192.1 | 1 2304 0 | 0 | 1 | local | d | 1 | 96 | 205e | 0 | 192 | uplink192_inet |
| 8.8.8.8 | (0 ) N/A | Not-Classified | (0 ) | | FI | | | | | | |
| 8.8.8.8 | 172.33.192.1 | 1 2560 0 | 0 | 1 | local | d | 1 | 96 | 2967 | 0 | 192 | uplink192_inet |
| 8.8.8.8 | (0 ) N/A | Not-Classified | (0 ) | | FCI | | | | | | |
| 172.33.192.1 | 8.8.8.8 | 1 1792 2048 | 0 | 1 | local | e | 1 | 120 | 37db | 80001 192 | uplink192_inet |
| 8.8.8.8 | (0 ) N/A | Not-Classified | (0 ) | | FCI | | | | | | |
| 172.33.192.1 | 8.8.8.8 | 1 2304 2048 | 0 | 1 | local | d | 1 | 120 | 464f | 80001 192 | uplink192_inet |
| 8.8.8.8 | (0 ) N/A | Not-Classified | (0 ) | | FCI | | | | | | |
| 172.33.192.1 | 8.8.8.8 | 1 2560 2048 | 0 | 1 | local | d | 1 | 120 | 4f76 | 80001 192 | uplink192_inet |
| 8.8.8.8 | (0 ) N/A | Not-Classified | (0 ) | | FCI | | | | | | |

1400

| (9004-DC42) #show datapath session uplink \| include 8.8.8.9 | | | | | | | | | | |
|---|---|---|---|---|---|---|---|---|---|---|
| 172.33.192.1 | 8.8.8.9 | 1 3328 2048 | 0 | 1 | local | 5 | 1 | 120 | abd | 80001 192 | uplink192_inet |
| 8.8.8.9 | (0 ) N/A | Not-Classified | (0 ) | | FCI | | | | | | |
| 172.33.192.1 | 8.8.8.9 | 1 2816 2048 | 0 | 1 | local | a | 1 | 120 | 18cf | 80001 192 | uplink192_inet |
| 8.8.8.9 | (0 ) N/A | Not-Classified | (0 ) | | FCI | | | | | | |
| 172.33.192.1 | 8.8.8.9 | 1 3072 2048 | 0 | 1 | local | 8 | 1 | 120 | 2005 | 80001 192 | uplink192_inet |
| 8.8.8.9 | (0 ) N/A | Not-Classified | (0 ) | | FCI | | | | | | |
| 8.8.8.9 | 172.33.192.1 | 1 3072 0 | 0 | 0 | local | 9 | 0 | 0 | 4cd4 | 0 | 192 | uplink192_inet |
| 172.33.192.1 | (0 ) N/A | Not-Classified | (0 ) | | FYI | | | | | | |
| 8.8.8.9 | 172.33.192.1 | 1 3328 0 | 0 | 0 | local | 6 | 0 | 0 | 666c | 0 | 192 | uplink192_inet |
| 172.33.192.1 | (0 ) N/A | Not-Classified | (0 ) | | FYI | | | | | | |
| 8.8.8.9 | 172.33.192.1 | 1 2816 0 | 0 | 1 | local | b | 0 | 0 | 741e | 0 | 192 | uplink192_inet |
| 172.33.192.1 | (0 ) N/A | Not-Classified | (0 ) | | FYI | | | | | | |

EXPEDITING CORRECTION OF WAN OR LAN TRAFFIC LOSS

CROSS-REFERENCE TO RELATED APPLICATIONS

The present application is filed with two co-pending applications, including U.S. patent application Ser. No. 18/161,323, filed on Jan. 30, 2023 and U.S. patent application Ser. No. 18/161,341, filed on Jan. 30, 2023, both of which are incorporated by reference in their entirety.

BACKGROUND

A wide area network (WAN) uplink solution in a software-defined WAN (SDWAN) may include a physical and virtual uplink. For example, if there are two gateway controllers (GW), each having a physical uplink to an internet service provider (ISP), each gateway can use the other peer gateway's uplink as a virtual uplink by forming a generic routing encapsulation (GRE) tunnel from the downstream local area network (LAN). A WAN health check may be performed by the health check manager (HCM) based on set parameters.

This network topology may suffer from packet delay and data loss over the physical or virtual uplink. Typically, to accommodate WAN packet delay and loss, a health check probe may be sent at a ten second interval for which probe replies are expected within a ten second window. With high-speed internet replies may be received within milliseconds. If a reply is received within milliseconds of a probe, but a complete WAN outage happens immediately after the reply is received, the outage will not be detected until the next 10 second window following the next probe. If three retry probes are attempted, it may take up to 40 seconds to detect and confirm such an outage.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 13 shows flags used to mark probes in accordance with the embodiments described above.

FIG. 14 shows an illustrative example of the data traffic using flags in accordance with the embodiments described above.

Figure 1:
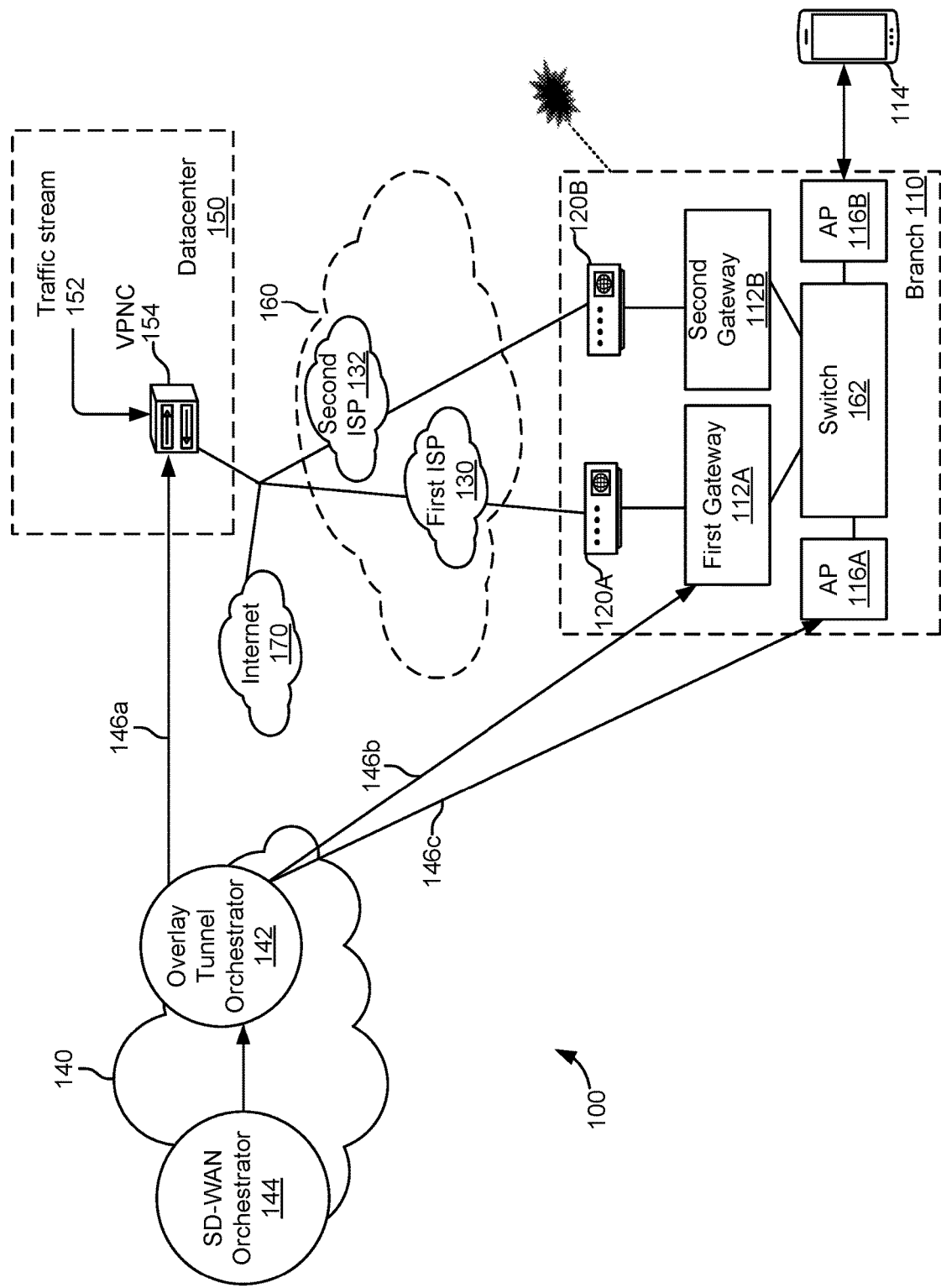
FIG. 1 is a diagram showing an example computing environment having at least two gateways in a branch with WAN and LAN communication channels in accordance with embodiments described herein.

The figures are not exhaustive and do not limit the present disclosure to the precise form disclosed.

DETAILED DESCRIPTION

As alluded to above, gateways typically run a WAN health check (e.g., by a health check manager) by sending a probe to a WAN IP over physical uplinks and virtual uplinks. Replies may be received on both the physical uplink and virtual uplink, and WAN traffic can be balanced between the physical uplinks and virtual uplinks in each gateway (e.g., by a load balancing engine). However, as examples of the present technology are designed in appreciation of, WAN health check timers are typically set high to accommodate packet loss and delay. For instance, a typical WAN health check configuration may involve a probe interval of ten seconds with three retry attempts (i.e., connectivity failures may be confirmed only after three consecutive probes spaced apart by 10 seconds). For example, a first gateway may send a probe packet on virtual uplink at 10:00:00 (hour:minute:second). Successful replies to the probe packet may be received within few milliseconds. The first gateway may then lose connectivity to the second gateway at 10:00:02 (e.g., via the virtual uplink). The next probe may not be sent until 10.00.10. If the connectivity issues persists, that attempt can fail again and two more attempts will be executed at 10.00.20 and 10.00.30 before confirming failure and rerouting of traffic. This means the first gateway could lose WAN traffic over the virtual uplink for a period of 38 seconds or more (e.g., if retry and frequency values correspond with the illustrative values provided herein). A frequency value of 10 seconds, as shown in the example, may be a high frequency value relative to other options.

Against this backdrop, the present technology provides systems and methods that reduce WAN traffic loss on virtual uplinks (e.g., caused by poor LAN networking) by aggressively checking WAN health for certain scenarios posing connectivity issues and utilizing the physical uplink while the virtual uplink is down. As will be described in greater detail below, the present technology can leverage "heartbeat" probes utilized by internal LAN networks to perform these more frequent/aggressive WAN health checks. In other words, a system of the present technology can use the LAN connection between devices to work around WAN connectivity issues and minimize traffic loss overall. For example, such a system can implement an aggressive LAN health check using one or more LAN-related heartbeat probes to detect network issues more quickly than existing WAN health checks. That is, leveraging internal LAN network infrastructure already being used for other purposes, systems of the present technology can perform WAN health checks more quickly/frequently that existing WAN health checks/ WAN HCMs.

As alluded to above, and as examples of the present technology are designed in appreciation of, WAN health check timers are typically set high to accommodate packet loss and delay. However, for an internal LAN network, packet loss and delay is negligible. In internal LAN networks, setting retry and frequency values high is not necessary. For example, the first gateway WAN high availability (HA) virtual local area network (VLAN) (e.g., a virtual uplink tunnel) may transmit a probe every second with three attempts to reestablish the connection. The one second interval-repeating probe may be described as a "heartbeat." The one second interval may be, for example, an example of a relatively low frequency interval (e.g., certain LAN-related heartbeat probes operate with millisecond scale frequencies).

In some examples of the present technology, if probe failure persists for multiple LAN-related heartbeats, an HCM process (e.g., a tunnel HCM process) may immediately notify an uplink manager to suspend a virtual uplink from a WAN uplink load balance in the a gateway. The suspension may be implemented by notifying a fastpath application ("FPAPPS") process to remove any routes via the virtual uplink without waiting for the typical 38-40 second WAN health check timer to complete. A FPAPPS process may be responsible for removing and/or adding routes to the virtual uplink. Sessions can then be sent only on the physical uplink of the first gateway which is reachable to WAN, since other routes were suspended.

In various examples, a system of the present technology can mark a status of a physical uplink as reachable and a status of a virtual uplink as unreachable prior to completion of a WAN health check. The system may update a default gateway to the physical uplink and remove the virtual uplink so that the default gateway can use the physical uplink to maintain data transmissions to the network from the gateway device via the physical uplink and suspend or stop connections via the virtual uplink. The system can continue to monitor the accessibility to the network from the gateway device via the virtual uplink by listening for a tunnel heartbeat from the virtual uplink.

In certain examples, a system of the present technology can monitor accessibility to a network from a gateway device of a cluster of gateway devices. For example, the system may initiate a cluster heartbeat process once a cluster of gateway devices are formed. When a response is received from a first gateway (of the cluster of gateways) and not a second gateway (of the cluster of gateways) within a threshold period of time, the system may notify an uplink regarding a network issue. The uplink manager may be configured to suspend the virtual uplink as unreachable, suspend a WAN health check, update a default gateway to remove the virtual uplink and utilize the physical uplink outside of the cluster of gateway devices as a default connection to the first network accessible via the ISP of the first gateway device, and concurrently maintain data transmissions to the first network from the physical uplink outside of the cluster of gateway devices.

In some examples, a system of the present technology can monitor accessibility to a network from a gateway device using a data session table. For example, the system can determine a shortest time interval heartbeat sub-set of at least two types of heartbeat traffic detected between a first gateway device and a second gateway device. The first gateway device may be communicatively connected to the second gateway device via a virtual uplink over a LAN connection. The system may next determine that heartbeat responses from the second gateway device to the first gateway device are missing for both of the at least two types of heartbeat traffic in the shortest time interval heartbeat sub-set. Determining that the heartbeat responses from the second gateway device to the first gateway device are missing for both of the at least two types of heartbeat traffic in the shortest time interval heartbeat sub-set may comprise monitoring forward session entries and reverse session entries of a data session table to detect that reverse session entries associated with the first and second gateways devices and both of the at least two types of heartbeat traffic in the shortest time interval heartbeat sub-set are flagged as unsynchronized with forward session entries. Upon determining that the heartbeat responses from the second gateway device to the first gateway device are missing for both of the at least two types of heartbeat traffic in the shortest time interval heartbeat sub-set, the system can suspend the virtual uplink between the first gateway device and the second gateway device.

FIG. 1 is a diagram showing an example computing environment having at least two gateways in a branch with WAN and LAN communication channels in accordance with embodiments described herein. In illustration 100, branch or site location 110 is provided. Branch 110 comprises a set of gateways 112 (illustrated as first gateway 112A and second gateway 112B), access points (AP) 116 (illustrated as first AP 116A and second AP 116B), routers 120 (illustrated as first router 120A and second router 120B), and switch 162 that may be located downstream from the gateways 112. Internet Service Providers (ISPs) 130, 132 may provide access to the Internet 170 or some other communication network for client 114 via one or more devices illustrated in FIG. 1, including through second AP 116B. ISPs 130, 132 may make up a WAN 160 controlled via an SD-WAN, and a second end-point device, which in this case may be VPNC 154 (which receives traffic from a traffic stream source 152) of a datacenter 150.

Traffic stream 152 may be any data transmission (e.g. streaming media, information dissemination, etc.) addressed to one or more receivers/end-points. In the example of FIG. 1, only one traffic stream (i.e., traffic stream 152) is depicted in datacenter source 150. However, in other examples datacenter 150 may include any number of traffic streams and branch 110 may include any number of traffic sources, recipients, etc.

In general, a VPNC, such as VPNC 154 may refer to a hardware or software application used for connecting VPNs. As depicted, datacenter 150 includes VPNC 154. Accordingly, VPNC 154 may be used to transmit data associated with traffic stream 152 to one or more branches, in this example, to the set of gateways 112 of branch 110 (as orchestrated by Overlay Tunnel Orchestrator 142).

SD-WAN 140 may be a cloud-based SD-WAN technology platform which includes a centralized service capable of performing orchestration operations within a given WAN (e.g. WAN 160). Generally, SD-WAN orchestration may refer to a centralized administration service(s) that provides cloud-delivered WAN control and management. In certain examples, SD-WAN 140 may include additional centralized network management services. Accordingly, residing within SD-WAN 140 may be various sub-services. As depicted, SD-WAN 140 includes Overlay Tunnel Orchestrator 142 which may be a sub-service of SD-WAN Orchestrator 144, which, in addition to orchestrating tunnels, may orchestrate routes, orchestrate key exchange, creating and managing clusters, and so on.

Overlay Tunnel Orchestrator 142 may be a central management entity which orchestrates routes for traffic between datacenter 150 and branch 110 via connection 146 (illustrated as first connection 146a between Overlay Tunnel Orchestrator 142 and VPNC 154, second connection 146b between Overlay Tunnel Orchestrator 142 and first gateway 112A, and third connection 146c between Overlay Tunnel Orchestrator 142 and first AP 116A). For example, Overlay Tunnel Orchestrator 142 may include a tunnel manager process locally to form an overlay tunnel, then generate and transmit messages to each of the end points through the overlay tunnel (VPNC 154, first gateway 112A, and first AP 116A). Each of the end points may include a similar tunnel agent process to receive and parse the messages via the overlay tunnel from the Overlay Tunnel Orchestrator 142. In order to accomplish this task, Overlay Tunnel Orchestrator 142 may identify or manage aspects of network topology/configuration, as well as the needs of the network's end-points. Abreast of this information, Overlay Tunnel Orchestrator 142 may then orchestrate routes between an appropriate VPNC and gateway and on to interested recipients.

As a central management entity incorporated within SD-WAN 140, Overlay Tunnel Orchestrator 142 may collect this information and make these determinations in a manner which reduces WAN bandwidth consumption. Said differently, centralized decision-making within Overlay Tunnel Orchestrator 142 greatly reduces the number of communications/decisions required to transmit traffic, such as multicast traffic, within, e.g., a large scale SD branch deployment. As described above, under the decentralized approach used by existing technologies, much of the aforementioned information would be communicated among the various network devices/nodes (e.g. routers, branch gateways, VPNCs) of a network tasked with transmitting traffic. Overlay Tunnel Orchestrator 142 may obtain certain network configuration/topology information from another service(s) of SD-WAN orchestrator 144, and information related to the needs of the network's recipients/hosts from designated branch gateway leaders.

For example, SD-WAN orchestrator 144 may include a Containers-as-a-Service (CaaS) service (not shown) that may refer to a cloud-based service which offers organizations a way to manage their virtualized applications, clusters, and containers. A CaaS may include a container orchestration engine that runs and maintains infrastructure between an organization's clusters. A CaaS may also manage clusters associated with branch gateways, which may be referred to as BG clusters. Within a given BG cluster, there may be one cluster leader. As will be described in greater detail below, the leader of a given BG cluster can (a) send requests to join or leave a multicast group to Overlay Multicast Orchestrator 142; and (b) receive multicast traffic from one of the VPNCs which reside in datacenter 150. By leveraging existing cloud-based service infrastructure and features, examples of the presently disclosed technology can enhance a multicast orchestration service without consuming significant additional WAN bandwidth, cloud resources, etc.

In some examples, a route computation engine in Overlay Tunnel Orchestrator 142 may calculate routes for traffic based on the aforementioned source information (e.g., which VPNC is associated with a given multicast stream) and receiver information (which branch gateways are designated leaders for the given multicast stream). In some examples, the route computation engine may learn to calculate optimal routes for reducing bandwidth consumption for WAN 160. For example, Overlay Tunnel Orchestrator 142 may employ artificial intelligence (AI) or machine learning to determine overlay tunnels for multicast traffic between VPNCs and branch gateways (e.g., based on traffic requirements and historical data).

In other examples, Overlay Tunnel Orchestrator 142 may take advantage of routes which have already been calculated by SD-WAN 140 (and/or its subservices). Existing SD-WAN services typically calculate routes for unicast traffic between VPNCs and branch gateways. Accordingly, Overlay Tunnel Orchestrator 142 may orchestrate traffic through these pre-calculated routes.

It should be understood that in a given network, the "underlay" or "underlay network" may refer to the physical connections of the network (e.g., Ethernet). By contrast, the "overlay" or "overlay network" may refer to a logical network which uses virtualization to build connectivity on top of the physical infrastructure of the network using tunneling encapsulation. In other words, "overlay tunnels" may refer to virtual links which connect nodes of a network. Here, overlay tunnels may connect VPNCs and branch gateways. Various protocols such as IPSec and GRE may be used to transmit network traffic through these overlay tunnels. In general, SD-WAN architectures like the one depicted may rely on overlay tunnels to connect the various branches and other nodes of their network.

As used herein, branch 110 may refer to a physical location at which one or more end-point devices may connect to WAN 160. For example, a branch may be a remote office of an organization, a café/coffee shop, a home office, etc. While only a single branch (branch 110 comprising a set of gateways 112) is depicted in the example of FIG. 1, large scale SD branch deployments may include any number of branches. In certain examples, these may be branches of a particular organization. In other examples branches may not all be associated with a single organization. While not depicted, each branch may have its own local area network (LAN). The various network devices (e.g. hosts (user-associated devices), end-point devices, such as branch gateways, network devices, such as routers, etc.) of a given branch may communicate with each other over the branch's LAN. A branch may have any number of end-points. In this example branch gateway 112 may receive traffic (such as multicast traffic) associated with traffic stream 152.

A given host, an example of which is smartphone 114, may be connected to AP 116 that communicates with gateway 112. As described above, multiple gateways 112 may be deployed at branch 110 for load balancing and redundancy purposes. Accordingly, a given host may connect with a given branch gateway based on factors such as path latency.

AP 116 may be configured to provide a communication channel between smartphone 114 and network 170 using various devices in branch 110, though it may not be the only point of communication. Multiple APs are illustrated, though branch 110 may include one or more APs 116 with multiple controllers and/or multiple communication points. In some embodiments, AP 116 communicates with the network 170 through switch 162, second gateway 112B, and second router 120B, or may also communicate with the network 170 through switch 162, first gateway 112A, and first router 120A. In some examples, AP 116 may comprise multi-band radios, such as dual-band simultaneous radios that can operate with, e.g., eight radio chains in the 5 GHz band and four radio chains in the 2.4 GHz band. At runtime, the 5 GHz radio can be converted into two logical radios each operating with four radio chains, for example. Channel switching can be prompted by, e.g., detection of radar or when channel utilization is beyond acceptable limits or in response to some regulatory change(s) affecting channel usage or allocation. Other features of a generic access point may be implemented with one or more APs 116 as well.

Gateway 112 may refer to a network device (hardware or software) which transfers traffic between devices (e.g., AP 116 and switch 162) associated with branch 110 and other networks. For example, gateway 112 depicted in FIG. 1 may transfer traffic between WAN 160 and the various network devices (not shown) of their branch (e.g. other branch gateways, hosts, etc.).

Figure 2:
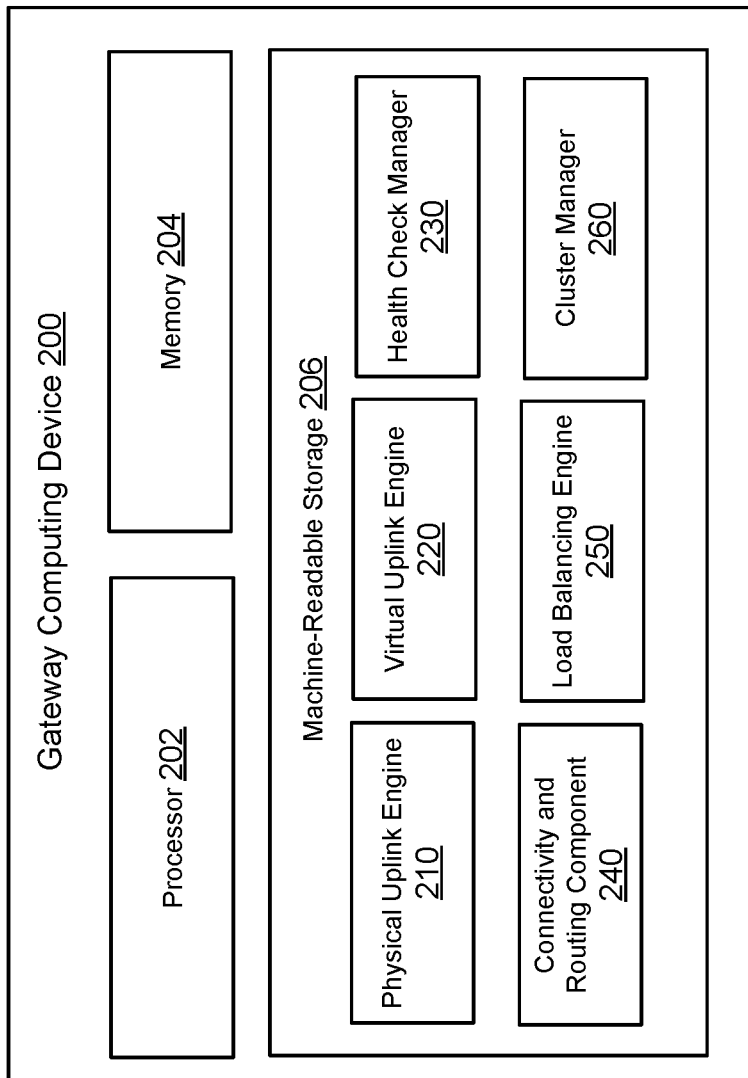
FIG. 2 is a diagram showing an illustrative process of establishing a LAN virtual uplink in a computing environment having at least two gateway controllers in a branch in accordance with embodiments described herein.

Gateways 112 may also be configured to establish communication connections to various networks and detect/correct communication issues, as shown in FIG. 2. In this example, gateway computing device 200 comprises a processor 202, memory 204, and machine-readable storage 206 that may implement machine-readable instructions to perform various actions within the network. For example, machine-readable storage 206 may comprise physical uplink engine 210, virtual uplink engine 220, health check manager 230, connectivity and routing component 240, load balancing engine 250, and cluster manager 260.

Physical uplink engine 210 is configured to manage the physical uplink between gateway 112 and another device. For example, the physical uplink may comprise a wired connection between first gateway 112A to first router 120A to ISP 130, and also manage the physical uplink between second gateway 112B to second router 120B to ISP 132. The connection via physical uplinks may be initiated by a Dynamic Host Configuration Protocol (DHCP) handshake (e.g., via Ethernet port 001 of first gateway 112A) followed by a broadcast process answered by ISP 130 or similar connection process (e.g., zero-touch provisioning). In this example, a first ISP connection would be associated to first gateway 112A and a second ISP connection would be associated to second gateway 112B.

Virtual uplink engine 220 is configured to manage the virtual connection between gateway 112 and another device using a virtual connection. For example, the virtual uplink may comprise a virtual (e.g., wireless) connection between first gateway 112A to switch 162 to second gateway 112B to second router 120B to ISP 132, and also manage the virtual uplink between second gateway 112B to switch 162 to first gateway 112A to first router 120A to ISP 130. The connection via virtual uplinks may be managed by an orchestrator or central processor (e.g., at SD-WAN 140 of FIG. 1). These additional connections may be helpful in providing network access through a different communication path in case the physical uplink goes down.

In some examples, physical uplink engine 210 may access the network through a WAN connection and virtual uplink engine 220 may access the network by forming a generic routing encapsulation (GRE) tunnel from the downstream LAN. In other words, from the point of view of first gateway 112A, first ISP 130 is a physical uplink connection (via WAN) and second ISP 132 is a virtual uplink connection (via LAN), both of which provide access to the network.

Health check manager 230 (sometimes referred to as "HCM") is configured to identify an internet protocol (IP) route and track probe requests and replies/responses (used interchangeably) from one or more devices. For example, health check manager 230 operating at first gateway 112A in FIG. 1 may send a heartbeat request or WAN health check probe (used interchangeably) to devices within branch 110, including second gateway 112B and switch 162, as well as first ISP and second ISP, to identify which devices are reachable and responding, or whether they are unreachable. When devices respond to the heartbeat request (e.g., within a millisecond reply time via the virtual uplink connection between the devices), health check manager 230 may determine that these devices are operating properly (e.g., able to send and receive data packets) and the network is healthy. The status of the reachable or unreachable devices may be updated in a table, as illustrated herein.

The heartbeat request or WAN health check probe may comprise various formats and protocols. For example, the heartbeat request or WAN health check probe could be an Internet Control Message Protocol (ICMP) ping transmission or a User Datagram Protocol (UDP) ping transmission. When the device is working properly and receives the heartbeat request or WAN health check probe, the device may be configured to automatically respond to the heartbeat request or WAN health check probe with a reply using the same protocol format.

When heartbeat replies are not received within a threshold amount of time, health check manager 230 may resend heartbeat requests at a predetermined interval. The default time may be set, for example, to ten seconds, so that a new heartbeat request is sent at each ten second interval for a total number of attempts (e.g., three attempts). In some examples, the repeated attempts to receive a heartbeat reply (without responses) may confirm that there is an issue with the device causing data loss (e.g., a WAN failure to cause the device to not provide the heartbeat reply) and not an intermittent failure (e.g., intermittent ping loss that the device can recover from quickly). The total amount of time to confirm the data loss in this example would be thirty seconds, or three attempts waiting ten seconds between each attempt.

When the data loss is confirmed, health check manager 230 may communicate with the uplink engine to take down the affected uplink in response to the reported failure (e.g., the device corresponding with the "unreachable" status identifier). For example, when the connection between first gateway and first ISP is affected, physical uplink engine 210 may take down the physical uplink connection. In another example, when the connection between first gateway and second ISP is affected, virtual uplink engine 220 may take down the virtual uplink connection.

By initiating a removal process of the virtual uplink connection, various actions may be implemented by health check manager 230. For example, the default gateway may be removed from the DHCP table of the affected gateway 112. In another example, once the uplink connection is removed with the removal process, health check manager 230 may communicate with connectivity and routing component 240 to update the route path for sending or receiving data (e.g., using a FPAPPS process to identify the route to transmit data, or changing the default uplink to the virtual uplink that remains operational). In some examples, the removal process initiates an action to remove the default gateway of the virtual uplink (e.g., when the ISP associated with the virtual uplink is unreachable and the ISP associated with the physical uplink is reachable). The removal process may include, for example, restarting one or more particular processes, individually, or restarting the entire second gateway. In some examples, a single application may be rebooted without restarting the second gateway. Similar operations can be implemented when the removal process is initiated for the physical uplink connection.

Load balancing engine 250 is configured to direct data packets using one or more uplink availabilities, including to first ISP 130 or second ISP 132. For example, with one physical uplink and one virtual uplink, load balancing engine 250 may direct data packets substantially equally across the two uplink options (e.g., physical and virtual uplinks).

One example of load balancing is show in Table 1, which uses first gateway 112A and second gateway 112B as options for a default gateway in routing Internet traffic. As discussed herein, first gateway 112A may utilize the physical uplink to access Internet 170 via first ISP 130 and may also have the option of utilizing the virtual uplink to access Internet 170 via second ISP 132.

FPAPPS Process Routing Table of First Gateway 112A
Show Ip Route

TABLE 1

| | | via | |
|---|---|---|---|
| S* 0.0.0.0/0 | [50/10] | 159.16.159.254 | >>default gateway of physical uplink |
| | | via | |
| | [50/10] | 161.16.161.254 | >>default gateway of Second Gateway 112B for virtual uplink |

Load balancing engine 250 is also configured to identify latency or delay in one of the uplink options and adjust the traffic to the other uplink option that is not experiencing the latency or delay. In some examples, when one uplink is down, load balancing engine 250 is configured to adjust the traffic to the other uplink option that is still operational.

Cluster manager 260 is configured to create a cluster of devices, for example, a cluster of gateway devices including first gateway 112A and second gateway 112B of FIG. 1. The cluster manager may, for example, associate these devices as a cluster in order to monitor operations, redistribute processing tasks, or other features reassigned between the devices in the cluster. Cluster manager 260 is configured to recover devices from failure scenarios and redistribute the tasks to other devices as the failed device is rebooted or other operations. With failure scenarios, when a hardware component fails, cluster manager 260 detects and recovers the cluster via identification of another device in the cluster (e.g., first gateway 112A and second gateway 112B) or creation of a new component member on the infrastructure foundation. Cluster manager 260 and the infrastructure may be designed with redundancy to safeguard against failure scenarios.

Various issues can exist in this system, which can be efficiently remedied using the connections and processes described herein.

Using the LAN Connection to Work Around WAN Traffic Loss

Gateways 112 typically run a WAN health check (e.g., by health check manager 230 of FIG. 2) by sending a probe to the WAN IP over physical uplinks and virtual uplinks. Replies are received on both the physical uplink and virtual uplink, and the WAN traffic is balanced between the physical uplinks and virtual uplinks in each gateway (e.g., by load balancing engine 250 of FIG. 2). However, for an example configuration involving a probe interval of ten seconds with three retry attempts, connectivity failures may be confirmed only after three consecutive probes. For example, a first gateway may send a probe packet on virtual uplink at 10:00:00 (hour:minute:second). Successful replies to the probe packet may be received within few milliseconds. The first gateway may then lose connectivity to the second gateway at 10:00:02 (e.g., via the virtual uplink). The next probe may not be sent until 10.00.10. If the connectivity issues persists, that attempt can fail again and two more attempts will be executed at 10.00.20 and 10.00.30 before confirming failure and rerouting of traffic. This means the first gateway could lose WAN traffic over the virtual uplink for a period of 38 seconds or more (e.g., if retry and frequency values correspond with the illustrative values provided herein). A frequency value of 10 seconds, as shown in the example, may be a high frequency value relative to other options.

WAN traffic loss on the virtual uplink (e.g., caused by poor LAN networking) can be reduced by aggressively checking LAN health for certain scenarios posing connectivity issues and utilizing the physical uplink while the virtual uplink is down, as illustrated herein. Typically, WAN health check timers are set high to accommodate packet loss and delay. However, for an internal LAN network, packet loss and delay is negligible. In internal LAN networks, setting retry and frequency values high is not necessary. For example, the first gateway WAN high availability (HA) virtual local area network (VLAN) (e.g., a virtual uplink tunnel) may transmit a probe every second with three attempts to reestablish the connection. The one second interval-repeating probe may be described as a "heartbeat." The one second interval may be, for example, an example of a relatively low frequency interval (e.g., prior or equal to three seconds). If probe failure persists for three seconds, a tunnel HCM process may immediately notify the uplink manager to suspend the virtual uplink from the WAN uplink load balance in the first gateway. The suspension may be implemented by notifying a fastpath application ("FPAPPS") process to remove any routes via the virtual uplink without waiting for the typical 38-40 second WAN health check timer, described above, to complete. A FPAPPS process may be responsible for removing and/or adding routes to the virtual uplink. Sessions can then be sent only on the physical uplink of the first gateway which is reachable to WAN, since other routes were suspended.

In some examples, the illustrative system can use the LAN connection between devices to work around WAN connectivity issues and minimize traffic loss overall. For example, the system can implement an aggressive LAN health check using one or more tunnel HCM probes for detecting network issues early, since the WAN HCM takes significantly longer to detect (with retry attempts and heartbeat probes) than the internal LAN network that is already established for other purposes.

Figure 3:
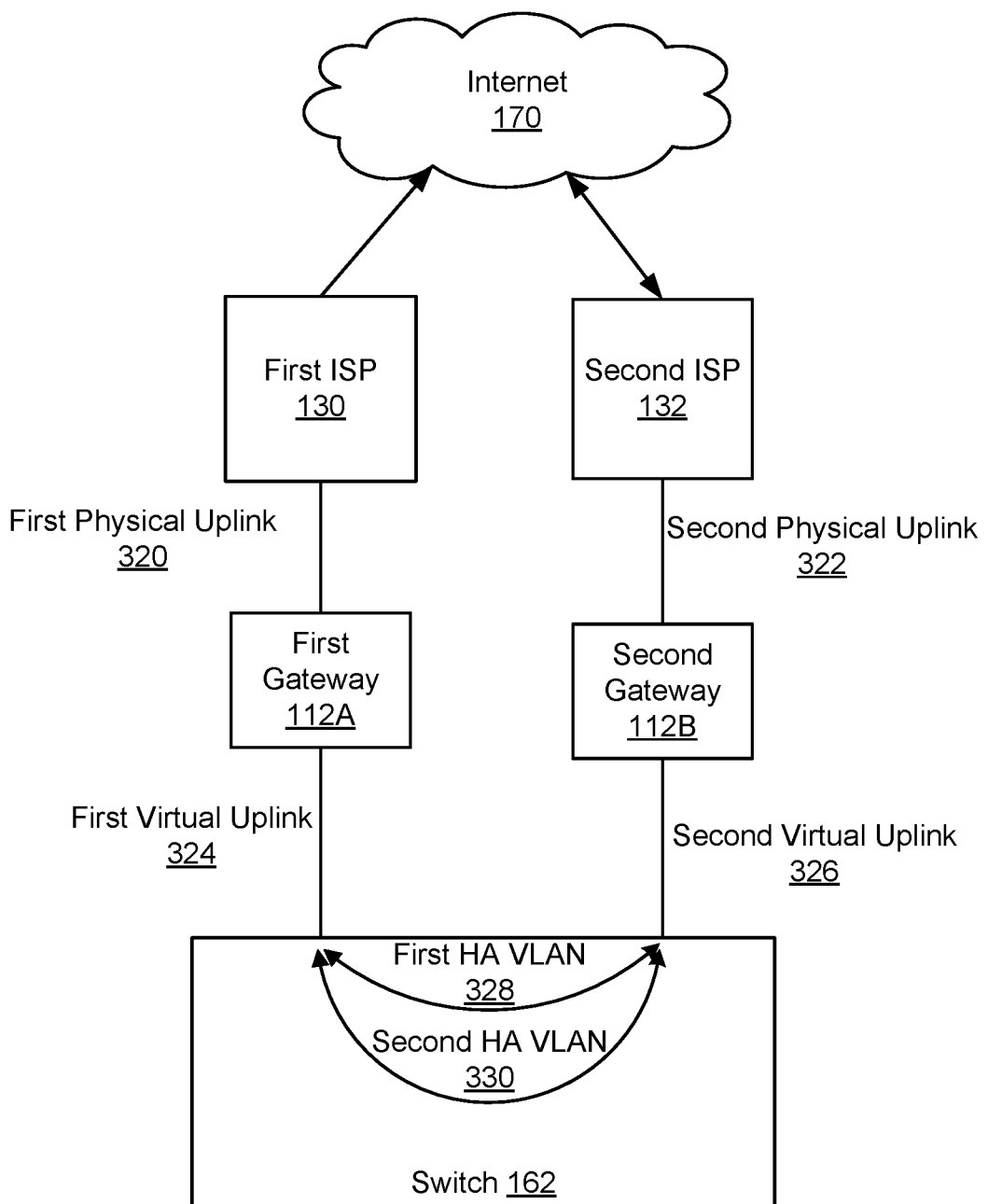
FIG. 3 is a diagram showing an example of a topology using the LAN connection to remedy WAN traffic loss in accordance with embodiments described herein.
Figure 4:
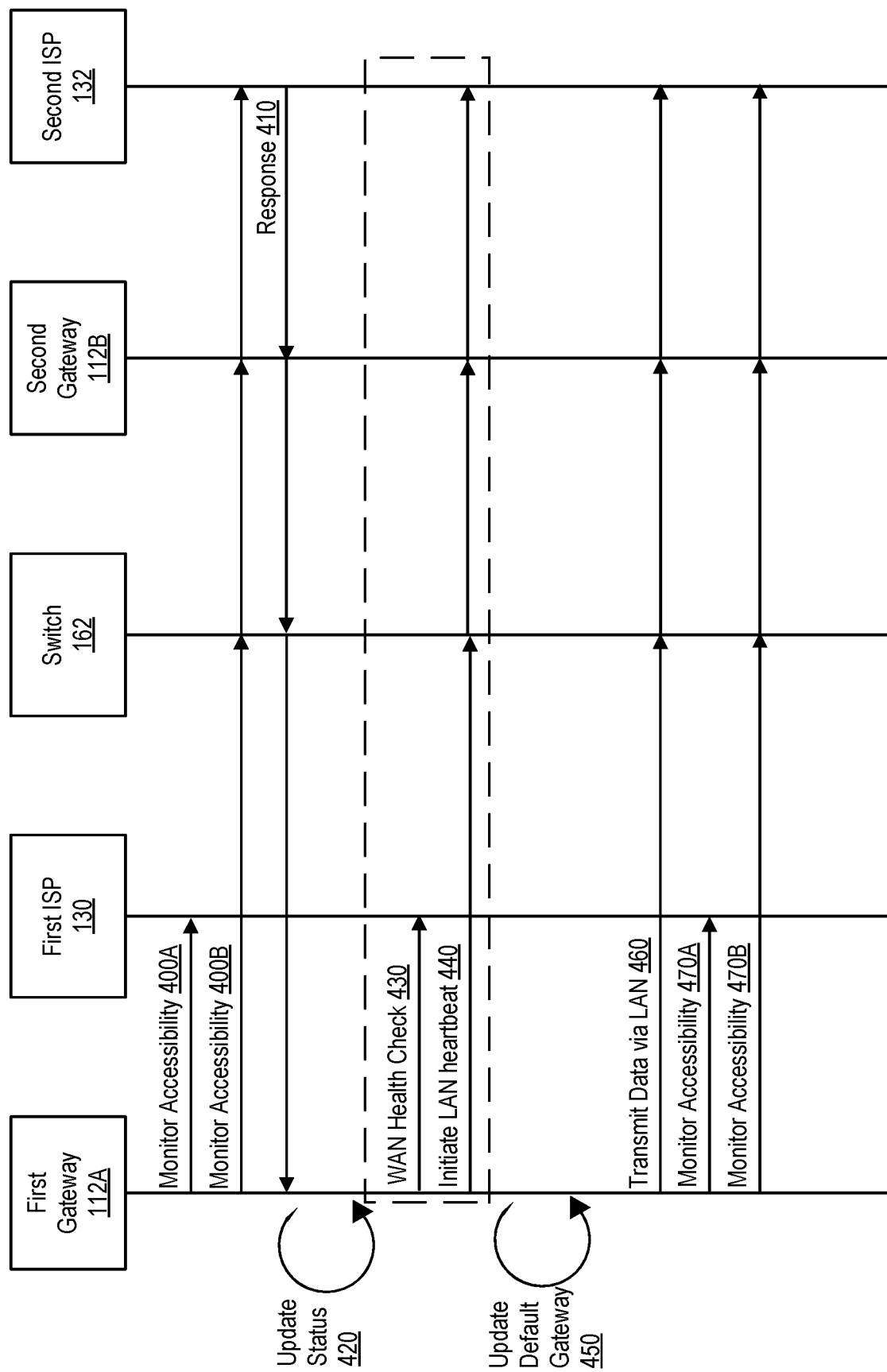
FIG. 4 is an illustrative communication flow using the topology in FIG. 3 in accordance with embodiments described herein.

An illustrative example of using the LAN connection to work around WAN traffic loss is provided in FIGS. 3-4. For example, the topology illustrated in FIG. 3 may correspond with a simplified version of the devices in FIG. 1, for ease of illustration, including first ISP 130, first gateway 112A, second ISP 132, second gateway 112B, switch 162, and Internet 170. Additionally, various device implementation options are available. For example, two gateways may be communicatively connected to each ISP using physical or virtual uplinks. In this example, four gateways are available to direct traffic across the network to reach Internet 170, including physical uplinks and virtual uplinks.

As discussed herein, each gateway 112 may have a physical uplink 320, 322 to each ISP. This may enable each gateway 112 to utilize the other, peer gateway's uplink as a virtual uplink by forming a GRE tunnel from a downstream LAN network. As shown, a first gateway 112A may have a first virtual uplink 324. A second gateway 112B may have a second virtual uplink 326. A WAN HA feature may then configure two separate GRE tunnels 328, 330 between the first gateway 112A and the second gateway 112B carrying traffic mean for the first and second virtual uplinks 324, 326. The first gateway 112A may use the uplink 326 of the second gateway 112B by treating the GRE tunnel 330 as its own virtual uplink. The second gateway 112B may likewise use the uplink 124 of the first gateway 112A by using the GRE tunnel 328 as its virtual uplink. An FPAPPS process may handle routing. The FPAPPS process may use a default gateway of the second gateway 112B in its routing table, as illustrated in Table 1. The above-described components of FIG. 3 will also be described in conjunction with FIG. 4.

FIG. 4 shows an example process of using the LAN connection to work around WAN traffic loss in accordance with the embodiments described above. The devices illustrated in FIG. 4 may correspond with the topology illustrated in FIG. 3.

At block 400, illustrated as 400A, 400B, first gateway 112A may monitor the accessibility of first physical uplink 320 and first virtual uplink 324 using an HCM process. The HCM process may be implemented by health check manager 230 illustrated in FIG. 2.

In this example, first gateway 112A monitors accessibility by sending ICMP probes over first physical uplink 320 to first ISP 130 and first virtual uplink 324 to switch 162, then to second gateway 112B. The ICMP may ultimately be delivered to second gateway 112B (e.g., in an attempt to access second ISP 132). The accessibility may be monitored by sending probes via each uplink. For example, first gateway 112A may send ICMP probes over first physical uplink 320 at ten second intervals and with three retry attempts. Therefore, three probes can be sent, each ten seconds apart, before a reachability determination is made. Since the connection to second gateway 112B (via switch 162) is a HA VLAN signifying the first virtual uplink 324 in this example, the ICMP probes arrive in milliseconds to second gateway 112B when second gateway 112B is available.

Other frequencies are also possible. For example, probes may be sent 8 seconds apart, 12 seconds apart, 20 seconds apart, or at any other frequency. However, for the HCM process, frequencies are typically set high, at about 10 seconds, to avoid delays and other issues. Other retry attempts are also possible. For example, two retry attempts may be set or five retry attempts may be set. Other settings are also possible.

At block 410, first gateway 112A may receive one or more replies and generate a response. For example, when ICMP probes are sent at block 400, ICMP replies for the probes may be received at first gateway 112A. In this example, a connection issue exists at the physical uplink 320 between first ISP 130 and first gateway 112A. As such, receipt of ICMP replies may indicate that the virtual uplink 324 is reachable.

Since the connection to second gateway 112B (via switch 162) is a HA VLAN signifying the first virtual uplink 324, the replies from second gateway 112B to the ICMP probes are expected in milliseconds as well. When the replies are received within a threshold period of time (e.g., milliseconds, etc.), first gateway 112A may continue the connection process using second gateway 112B to access second ISP 132. When they are not received within a threshold period of time (e.g., milliseconds, etc.), the second gateway 112B is assumed to be unavailable. Either determination of availability or unavailability can be made within this shortened time frame based on the use of the HA VLAN signifying the first virtual uplink 324.

At block 420, internal to first gateway 112A, the health check manager may notify the uplink manager of the gateway status based on the received replies. For example, receipt of replies for the ICMP probes may indicate first virtual uplink 324 is available. The status for the virtual uplink 324 may then be marked reachable. This reachable status may then be communicated to the uplink manager.

At block 430, based on the non-responsive first physical uplink 320, various operations may be performed. These operations may utilize a WAN health check via first physical uplink 320 or utilize an alternative connection to Internet 170 via the LAN connection. The LAN connection may utilize, for example, the first virtual uplink 324, second virtual uplink 326, and second physical uplink 322 to access second ISP 132, which also provides access to Internet 170 (along with unreachable first ISP 130 via first physical uplink 320). An illustrative example providing the differences between the two approaches is provided herein.

For example, a WAN health check of first physical uplink 320 may be performed by an HCM process based on configurable health check parameters. The configurable health check parameters may include frequency interval and repeat parameters (e.g., frequency may be configured as ten seconds with a retry value of three). The HCM process may send ICMP packets to first ISP 130 via first physical uplink 320, which was non-responsive, using the configurable health check parameters (e.g., ten second frequency interval or other high frequency interval value and three repeated attempts). If a WAN reachability failure occurs, the HCM process may then repeat the health check, in this case three times, sending ICMP packets two more times, at ten second intervals. If the failure persists after the third attempt, the HCM process may confirm the WAN reachability failure via first physical uplink 320. The HCM process may notify an uplink manager of the WAN reachability failure. The uplink manager may mark the uplink as unreachable where the probe failed. The load may be balanced between the physical uplinks and virtual uplinks depending on WAN reachability. An example command line interface ("CLI") output of uplinks maintained by the uplink manager is shown:
(GW1) #Show Uplink

TABLE 2

| Uplink Manager: | Enabled |
|---|---|
| Uplink Health-check: | Enabled |
| IP: | 8.8.8.8 |
| Uplink Load-balancing: | Enabled |
| Mode: | Round-robin |

An example of an uplink management table, with health check parameters configured as discussed above is shown:

TABLE 3

Uplink Management Table

| Uplink Type WAN Type | Properties Speed | Uplink-id Weight | State Bandwidth Utilization | Gateway Maximum Bandwidth | Reachability |
|---|---|---|---|---|---|
| Wired Internet | Vlan 4094 1.000 Gbps | Uplink4094_inet 10 | Connected 0.00% | 161.16.161.254 100% | Reachable |
| Virtual Internet | Tunnel 10 1.000 Gbps | Uplink4093_inet 10 | Connected 0.00% | 159.16.159.254 100% | Reachable |

As discussed herein and provided for clarity in this context, health check intervals may be set high, at around ten seconds, to accommodate WAN loss, jitter, latency, and other issues to avoid unnecessary flapping of WAN uplinks. However, setting the health check interval high, at around ten seconds, may also pose problems. Given the high frequency, it is possible that a WAN reachability failure may not be confirmed for a period of nearly forty seconds if the failure occurs soon after an ICMP probe is sent. This is because the next probes will be sent at ten second intervals and a failure will be confirmed only after three failed attempts to reach the WAN destination (e.g., the first ISP 130). For example, if the virtual uplink fails, traffic sent on the virtual uplink will be lost for a period of nearly forty seconds before it will be re-routed onto the physical uplink. Failures may occur for several reasons. For example, a failure could occur if the second gateway is given a reload due to an image upgrade, is reloaded due to high temperature, if the WAN HA tunnel is down, or for many other reasons.

Specifically, in one example scenario, a first gateway may lose connectivity to a second gateway at a time T. The second gateway may become unreachable to the first gateway for a variety of reasons. For instance, a load rebalance may result in unreachability. Other scenarios are also possible. A reload may occur due to a process crash, high temperatures, or for some other reason. The time T may occur 5 seconds after the most recent probe was sent. The most recent probe sent may have received replies indicating WAN reachability, so the uplink manager is not aware of any failure at the time T. If probes are sent at 10 second intervals, a probe to check WAN reachability may then be sent again 5 seconds after the time T. This probe may not receive a reply, indicating a WAN reachability failure. However, three attempts will be needed to confirm the failure. A first probe will be sent 15 seconds after the time T, also with no replies. A second probe will be sent 25 seconds after the time T, again with no replies. A final probe will be sent 35 seconds after the time T, again with no replies. This final attempt will confirm the WAN reachability failure. Only at this point, 35 seconds after the failure, will the uplink manager be notified of the failure. Therefore, traffic may be lost for a period of 35 seconds before the load is re-balanced. This loss may pose a significant impact on critical applications.

Alternatively, health check manager at first gateway 112A may utilize the LAN connection rather than (or concurrently with) performing the WAN health check. In this example, first gateway 112A may automatically access Internet 170 through second ISP 132 when a connection failure is identified with first ISP 130. Confirming a failure sooner, and re-routing the load accordingly, may greatly eliminate traffic loss and allow the load to be re-balanced sooner and may prevent lengthy periods of traffic loss. WAN health check timers are typically set with a higher frequency, of about ten seconds, as discussed above, to accommodate packet loss. However, internal LAN networks do not pose the same packet loss and delay issues. Therefore, determining the loss in a LAN network instead of a WAN network may allow for more aggressive health checks. Faster determination a loss of the virtual uplink in the LAN network may allow for rebalancing of the load such that the virtual uplink is not used for uplink load balance, since use of the virtual uplink will result in failure.

At block 440, first gateway 112A may run a probe via first virtual uplink 324 (e.g., at an aggressive interval like every 10 milliseconds). For example, a first gateway may transmit a probe via first virtual uplink 324 using a HA VLAN with an interval of one second and one or more retry attempts may follow to constitute a virtual uplink tunnel "heartbeat."

At block 450, first gateway 112A may update the default gateway using this path. For example, if the heartbeat receives a probe reply from this probe request, a new default gateway may be set using the path to second ISP 132 (via the virtual uplink 326 to second gateway 112B). In setting a new default gateway, first gateway 112A may suspend or stop WAN connections via first physical uplink 320 to first ISP 130, thus removing second gateway 112B as the default gateway (e.g., using FPAPPS) so that no traffic is transmitted via that connection. As shown in Table 3 (for first gateway 112A), the reachability identifier of second gateway 112B may also be changed from "reachable" to "unreachable." In some examples, WAN health check may be suspended based on the second connection to Internet 170 identified via LAN.

If the WAN HA heartbeat fails the initial probe and any retry attempts, the tunnel HCM process may immediately notify an uplink manager processor. The uplink manager may be concurrently executing a health check manager process, as described with block 430. The uplink manager may be listening to both the health check manager processes and the virtual uplink tunnel heartbeat. As discussed above, a period of up to 40 seconds may elapse before the health check manager process is able to confirm a loss of the virtual uplink. However, the virtual uplink heartbeat tunnel may confirm a loss of the virtual uplink in as little as four seconds.

Upon confirmation of a loss of the first virtual uplink 324, the tunnel HCM process may also notify the uplink manager.

At block 460, first gateway 112A may transmit data via the LAN connection to second ISP 132. This may allow first gateway 112A to maintain data transmissions to the network (internet 170) from first gateway 112A via the first virtual uplink 324. In some examples, the first gateway 112A may suspend or stop connections via first physical uplink 320 to remove the data transmissions to the network (internet 170) from first gateway 112A via first physical uplink 320 while concurrently maintaining data transmissions to the network from first gateway 112A via the first virtual uplink 324. This may help reduce data transmissions in the network when the system has already identified that the uplink or device is down.

Load of data transmissions may then be rebalanced (e.g., using both the virtual and physical uplinks that are available and reachable). Load rebalancing may help to avoid using the first virtual uplink 324 excessively, which can result in failure of all remaining network connections, since the physical uplink is unreachable and the virtual uplink is overloaded, resulting in a loss along both uplinks.

At block 470 (illustrated as first block 470A to first ISP 130 and second block 470B to second ISP 132), the tunnel HCM process may continue to listen for a physical uplink tunnel heartbeat or other replies. When the tunnel HCM process detects that the heartbeat has restored via first physical uplink 320 with the first gateway 112A, the tunnel HCM process may immediately notify the uplink manager. Detecting that the heartbeat has restored may indicate that the first physical uplink 320 is now reachable. The uplink manager may notify the FPAPPS process to update the default gateway to first physical uplink 320 (e.g., by adding back a default gateway; see Table 1 for the FPAPPS routing table). With multiple default gateways, via both the physical uplink and virtual uplink, the traffic load may be balanced again. Additionally, the uplink health check manager process may be reinstated for all paths (e.g., first physical uplink 320 and first virtual uplink 324).

In some examples, second gateway 112B may also identify that second virtual uplink 326 is down and first ISP 130 is unreachable (e.g., using both the WAN heartbeat probes and virtual uplink probes). This operation may be performed concurrently with the similar operation performed by first gateway 112A. For example, second gateway 112B may set a new default gateway using the second physical uplink 322, which may be a new default path to second ISP 132. In setting a new default gateway, second gateway 112B may suspend or stop WAN connections via second virtual uplink 326 to first ISP 130, thus removing first gateway 112A as the default gateway (e.g., using the FPAPPS process) so that no traffic is transmitted via that connection. As shown in Table 3 (for second gateway 112B), the reachability identifier of first gateway 112A may also be changed from "reachable" to "unreachable."

Using the WAN Connection to Work Around LAN Traffic Loss

Figure 5:
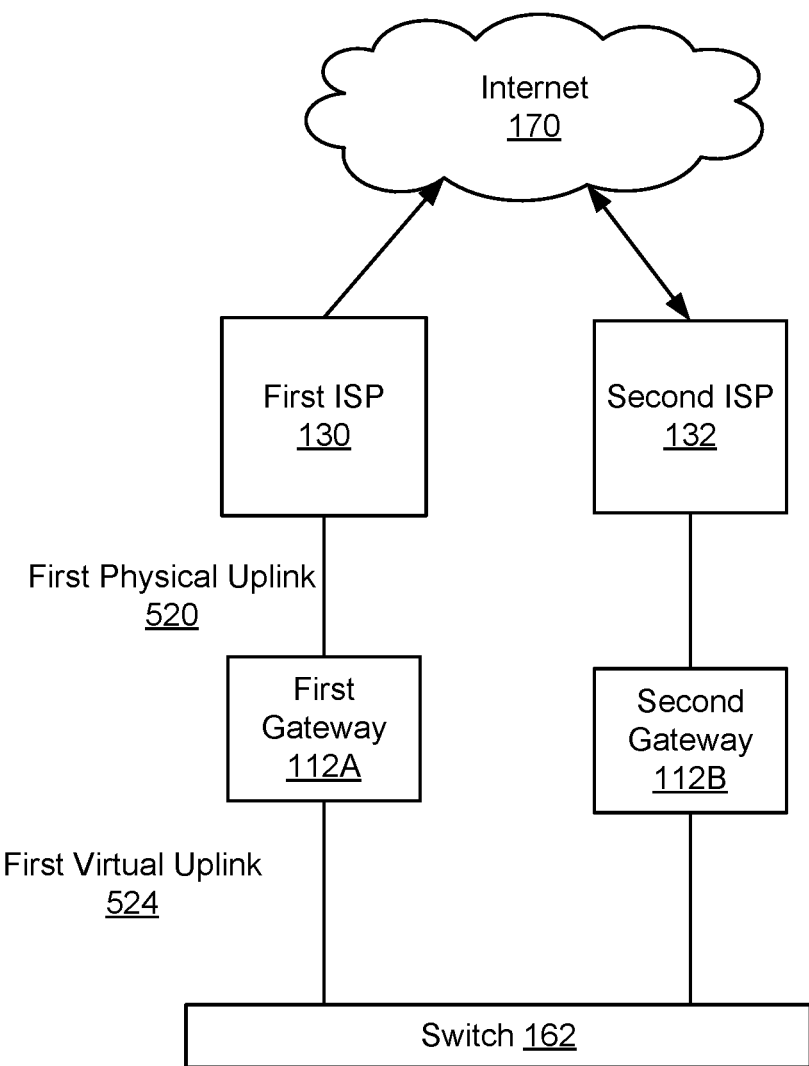
FIG. 5 is a diagram showing an example of a topology using the WAN connection to remedy LAN traffic loss in accordance with embodiments described herein.

Similar to using the LAN connection to work around a WAN connection loss, the system may also use a WAN connection to work around a LAN or virtual uplink connection loss, including the switch 162 or the HA VLAN, or other intermittent devices or connections. An illustrative topology is provided with FIG. 5 in connection with several communication processes illustrated with FIGS. 1-4.

In this example, if a virtual uplink loss is detected, for example by first gateway 112A at first virtual uplink 524, an uplink manager may immediately suspend the virtual uplink transmissions via first virtual uplink 524. In some examples, the default gateway of virtual uplink 524 is removed by the FPAPPS process. In some examples, the uplink manager may also immediately suspend waiting for responses to the heartbeat via first virtual uplink 524. If the loss is detected using a virtual uplink tunnel heartbeat, the loss may be detected in as little as 3-4 seconds, even when the default probe rate is set higher (e.g., ten seconds) via a physical or WAN connection. The uplink manager may then suspend the first virtual uplink 524 immediately after confirmation of the loss via the virtual uplink tunnel heartbeat. The uplink manager need not wait for the WAN probe result from the uplink health check manager process (e.g., which may take up to 40 seconds using the illustrative example discussed herein). This achieves significant reduction in traffic loss.

Additionally, the uplink manager may notify the health check manager process to suspend its regular WAN health check probe over the virtual uplink 524 immediately upon confirmation of the loss via the virtual uplink tunnel heartbeat. Upon confirmation of a loss of the virtual uplink 524, all session may be sent only over the first physical uplink 520 of the first gateway. The first physical uplink 520 may still be reachable to Internet 170 even though the first virtual uplink 524 is not reachable.

In some examples, the tunnel HCM process may continue to listen for a virtual uplink tunnel heartbeat. The tunnel HCM process may detect that the heartbeat has restored in the first gateway 112A. Detecting that the heartbeat has restored may indicate that the first virtual uplink 524 is now reachable. Upon detecting a heartbeat restoration indicating that the first virtual uplink 524 is now reachable, the tunnel HCM process may immediately notify the uplink manager. The uplink manager may notify the FPAPPS process to add back a default gateway over the first virtual uplink 524, as illustrated in Table 1 herein. With multiple default gateways, using both the physical and virtual uplinks, the traffic load may be balanced again. Additionally, the uplink health check manager process may be reinstated.

Figure 6:
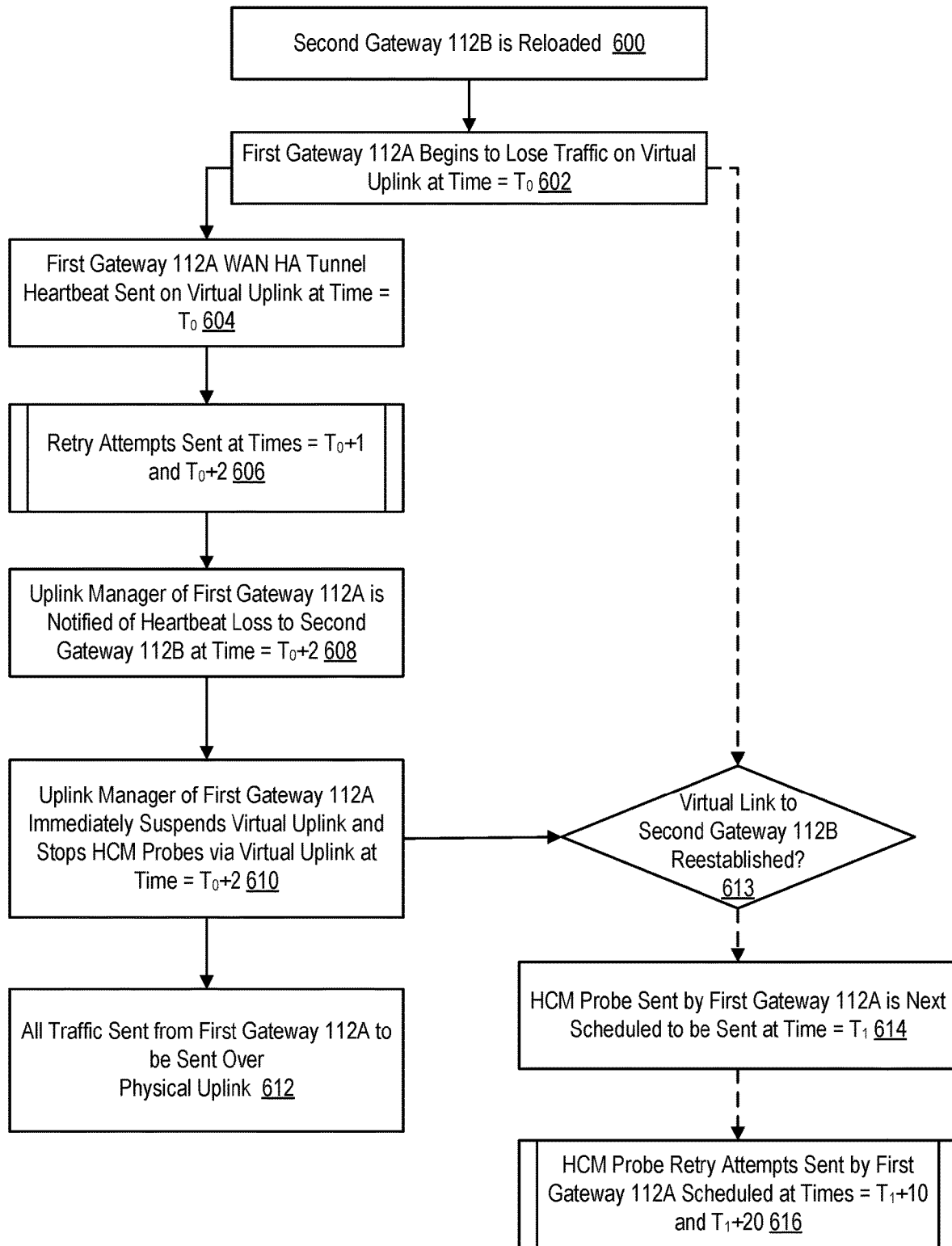
FIG. 6 is a flow diagram illustrating an example of a health check manager process in accordance with embodiments described herein.

An illustrative example is provided with FIG. 6, which shows the virtual uplink problem caused when second gateway 112B is removed, restarted, or reloaded, for example.

At block 600, the virtual uplink is lost based on the second gateway 112B being reloaded, which can trigger a transmission of a virtual uplink tunnel heartbeat. This initial event 300 may include several event which result in the loss of the virtual uplink. For example, one initial event may be that the second gateway 112B is reloaded.

At block 602, a consequence of second gateway being reloaded may cause first gateway 112A to begin to lose traffic. The first gateway 112A may begin to lose traffic at a time=$T_0$. The virtual uplink tunnel heartbeat may be sent through first virtual uplink 524 to determine whether the virtual uplink 524 may be used to send traffic.

At block 604, a virtual uplink tunnel heartbeat may be sent via first virtual uplink 524. The heartbeat may be a probe (e.g. transmitted via a communication channel at one second intervals or other low frequency interval). The first probe may be sent at a time=$T_0$.

At block 606, one or more retry attempts to send the probe may be initiated, including at one second intervals. In this illustration, retry attempts may be sent at times=$T_0+1$ and $T_0+2$. Three attempts may be sent. The attempts may include the initial attempt and the two retry attempts. Therefore, a retry value may total three, as three total probes are sent. Other numbers of retry attempts are possible. For example, in an embodiment, a single probe may be sent. In another embodiment, two probes may be sent. In other embodiments four, five, or more total probes may be sent. Additionally, a range of frequencies may be possible.

At block 608, the uplink manager may be notified of the heartbeat loss at time=$T_0+2$. This may be same time that the final retry probe is sent. A heartbeat loss may refer to the fact that though the probes are sent, no replies are received. Therefore, the heartbeats are lost.

At block 610, the uplink manager may immediately suspend virtual uplink traffic and may immediately stop the health check manager probe. The uplink manager may suspend virtual uplink traffic and the HCM probe at time=$T_0$+2. This may be the same time that the final retry probe is sent.

At block 612, all traffic may be sent over the physical uplink in the first gateway, instead of over the virtual uplink which is unreachable.

Once the link to the second gateway 112B is reestablished with first gateway 112A, the process may proceed with the physical uplink. For example, at block 613, the process may determine if the link to the second gateway 112B is reestablished.

At block 614, the HCM at first gateway 112A may optionally send the next scheduled probe. The next scheduled probe may be sent at time=$T_1$. The optional transmission of this HCM probe may be reliant on the connection with second gateway 112B being reestablished, which is referred to as $T_1$. Until the connection with second gateway 112B is reestablished, the HCM probe may be paused, suspended, stopped, or delayed, which may reduce data transmissions over the network connections while one of the uplinks is down or a device utilizing that uplink to reach an ISP is unreachable.

At block 616, one or more retry attempts may be optionally sent at a frequency of 10 seconds. For example, three total probes may be sent. After the initial probe sent at time=$T_1$, two additional probes may be sent at times=$T_1$+10 and $T_1$+20. However, if the virtual uplink tunnel heartbeat process, as described herein, is performed, the uplink manager may immediately suspend the HCM probe at time=$T_0$+2. This may occur even before the next scheduled HCM probe is sent and may certainly occur before retry HCM probes are sent. Therefore, the potential operations 614, 616 may not be performed.

Using the Cluster Manager of Clustered Gateways to Work Around a Cluster Split with LAN Traffic Loss In some examples, first gateway 112A and second gateway 112B may form a cluster of gateway devices via cluster manager (e.g., located in a cloud-based SD-WAN technology like SD-WAN 140 or internally to each gateway 112), which may add more communication engines when one or more uplinks or devices are down. A cluster may be a combination of multiple managed devices (e.g., gateways 112, etc.) working together to provide high availability and to ensure service continuity if a failure occurs. A cluster manager process may be implemented to enable communications between gateways using features of the cluster that might be originally intended for other purposes.

The devices may communicate via multiple communication tunnels. For example, as described herein, Overlay Tunnel Orchestrator 142 of SD-WAN 140 may communicate with VPNC 154 via first connection 146a using a first overlay tunnel, Overlay Tunnel Orchestrator 142 may communicate with first gateway 112A via second connection 146b using a second overlay tunnel, and Overlay Tunnel Orchestrator 142 may communicate with first AP 116A via third connection 146c using a third overlay tunnel, as illustrated in FIG. 1. In some examples, Overlay Tunnel Orchestrator 142 may include a tunnel manager process locally at each gateway 112 to form each overlay tunnel, then generate and transmit messages to each of the end points through the overlay tunnel (VPNC 154, first gateway 112A, and first AP 116A). Each of the end points may include a similar tunnel agent process to receive and parse the messages via the overlay tunnel from the Overlay Tunnel Orchestrator 142.

When a cluster is implemented between first gateway 112A and second gateway 112B, for example, these devices may also communicate at the direction of a cluster leader that is selected by a cluster manager. The cluster manager implemented at each gateway 112 may also identify the other devices as cluster members. In this example, first gateway 112A may be selected as the cluster leader and second gateway 112B may be selected as a cluster member. Cluster manager may also implement load balancing when first gateway 112A and second gateway 112B are operational.

The cluster manager may also determine when the HCM heartbeat is sent and processed by other cluster members and track any responses. In some examples, the cluster manager will generate a data packet map and transmit the data packet map to one or more APs 116 to identify the cluster members that are accessible. When a new connection is established between AP 116 and client 114, AP 116 may identify where to send data traffic based on the data packet map generated by the cluster manager (e.g., first gateway 112A).

When a cluster is implemented, the illustrative system can use functionalities that may be included with cluster implementations to work around WAN connectivity issues and minimize traffic loss overall. For example, the system can implement an aggressive cluster heartbeat check to detect network issues early, since the WAN HCM takes significantly longer to detect (with retry attempts and heartbeat probes) than the cluster heartbeat check that is already established for other purposes between devices in the cluster (e.g., first gateway 112A and second gateway 112B).

Figure 7:
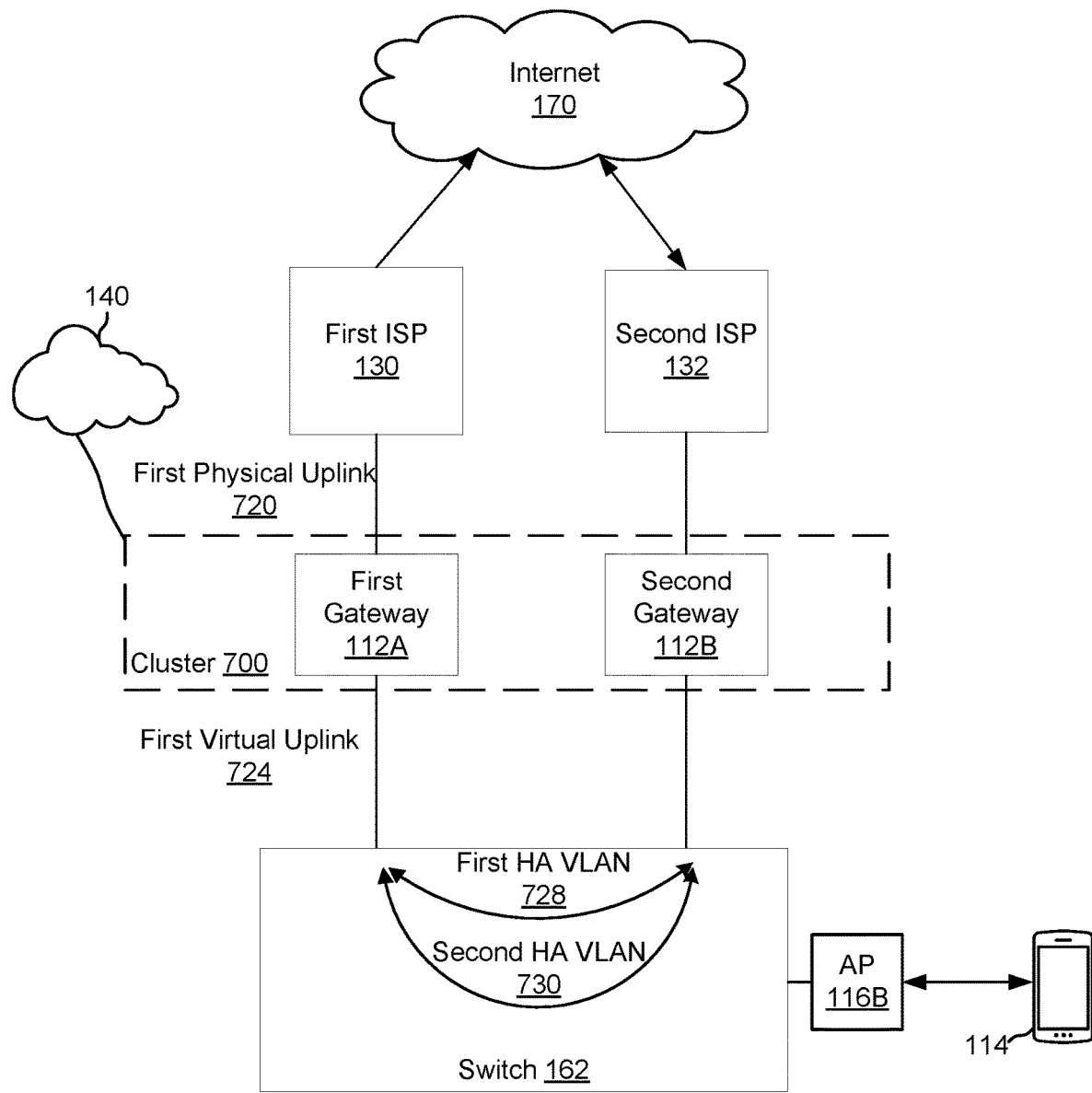
FIG. 7 is a diagram showing an example of a topology using the cluster manager to work around a cluster split and remedy LAN traffic loss in accordance with embodiments described herein.

An illustrative topology is provided with FIG. 7. In this example, cluster of gateways 700 is formed with first gateway 112A and second gateway 112B by cluster manager at SD-WAN 140 or other cloud-managed or locally-managed cluster process, like a cluster manager implemented at each gateway 112. First gateway 112A, second gateway 112B, and SD-WAN 140 are similarly described in FIG. 1 and throughout the application.

The devices in the cluster may communicate via a LAN connection implemented as an overlay tunnel (e.g., GRE tunnel via switch 162). When a cluster of gateways 700 is formed, each of the devices in the cluster can handle traffic as a high-availability (HA) feature. If one device goes down, the other devices can perform operations in their place, for example, by running a heartbeat for peer devices in the cluster and transmitting the instruction to the second device in the cluster. One or more cluster heartbeat packets may be transmitted through same communication channels as a default gateway.

Figure 8:
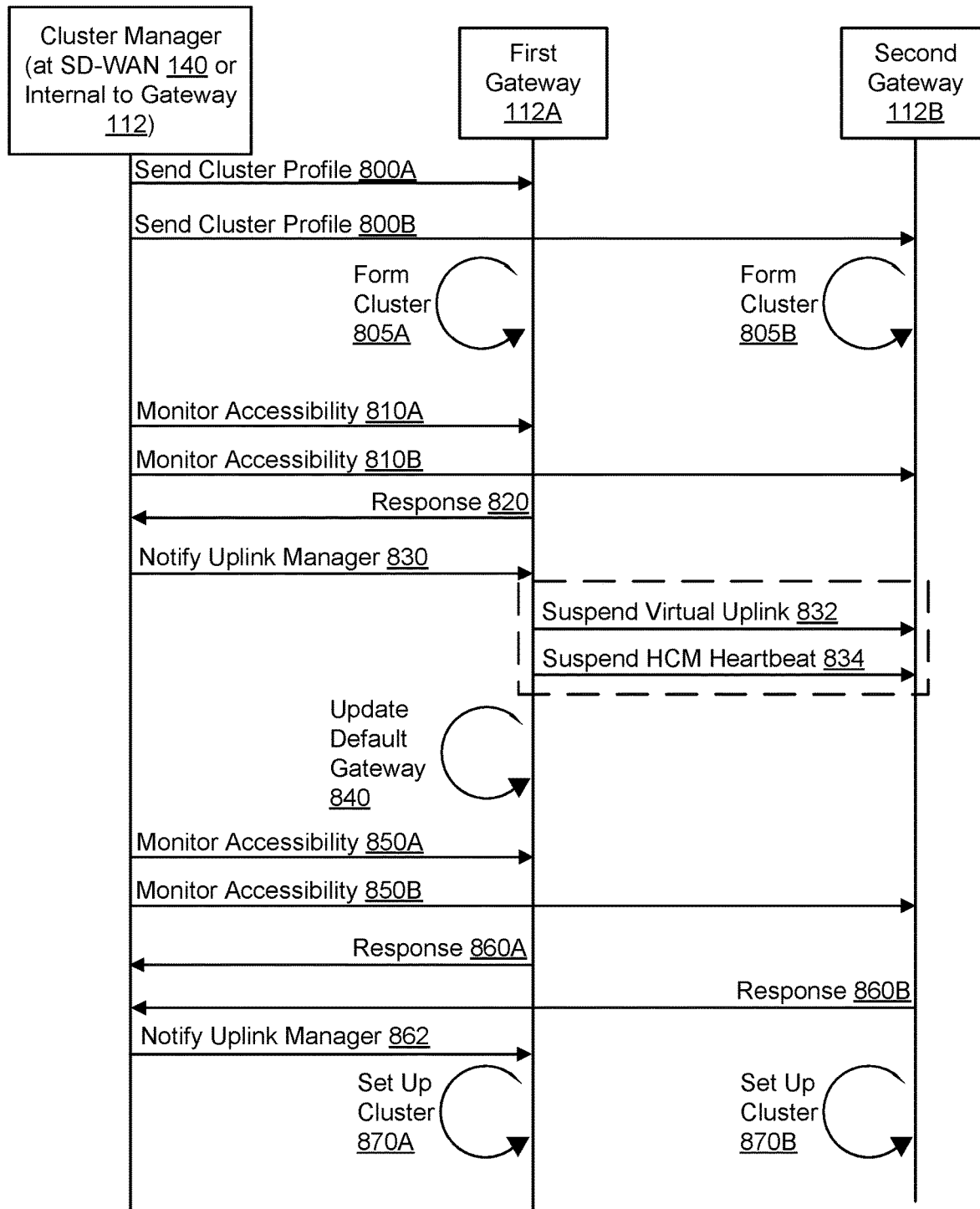
FIG. 8 is a flow diagram illustrating an example of a virtual uplink tunnel heartbeat process in accordance with embodiments described herein.

FIG. 8 illustrates a method of using the formed cluster of devices to work around a cluster split with LAN traffic loss using the topology illustrated in FIG. 7.

At block 800, SD-WAN 140 may push profile and configuration settings to each device to generate the cluster of gateways 700, illustrated as SD-WAN 140 sending cluster profile to first gateway 112A at block 800A and SD-WAN 140 sending cluster profile to second gateway 112B at block 800B.

At block 805, the profile and configuration settings be implemented by each cluster manager. As illustrated, first gateway 112A sets up the cluster of gateways 700 with second gateway 112B at block 805A and second gateway 112B forms the cluster of gateways 700 with first gateway 112A at block 805B. Using these settings, gateways 112 may form the cluster of gateways 700 including first gateway 112A and second gateway 112B.

As an illustrative example, when two gateways of the cluster of gateways 700 are configured to be part of same cluster profile, various steps may occur. For example, cluster manager initiates cluster heartbeat process to its peer. Cluster manager exchanges information regarding the gateways of the cluster of gateways 700 and the Media Access Control address (MAC address) to each peer. The controller at gateway 112 with highest platform capacity may be elected as a cluster leader and other gateways 112 as cluster members. If all gateways 112 have same platform capacity, then the highest MAC address may be elected as cluster leader and rest of the gateways 112 as cluster members.

The cluster leader may generate settings that are transmitted to one or more APs for configuring the APs as well. For example, the settings may include a bucketmap that instructs the AP how to forward a client's traffic (e.g., AP 116 of FIG. 1 forwarding the traffic of client 114 of FIG. 1). The bucketmap may contain IP addresses of each of the gateways participating in the cluster of gateways 700.

In some examples, the bucketmap may be used support client load balancing when the overlay tunnel is configured (e.g., IPSec or GRE). For example, the overlay tunnel gets formed between AP 116 and gateway 112. When client 114 connects to a communication channel (e.g., Wi-Fi), the traffic from client 114 reaches AP 116. AP 116 checks bucketmap to identify the gateway 112 to which traffic needs to be forwarded over the overlay tunnel. Client traffic may then reach the respective gateway based on bucketmap entry. The receiving gateway may also perform a load balance to send its traffic further to Internet 170.

At block 810, cluster of gateways 700 may be monitored by the cluster manager. For example, a cluster heartbeat probe may be transmitted to each of the devices in the cluster 700. When replies are returned from the devices to cluster manager, the device state may be determined (e.g., active, down, reachable, unreachable, etc.).

During the cluster heartbeat process, first gateway 112A may run a probe via first virtual uplink 724 (e.g., at an aggressive interval like every 10 milliseconds). For example, first gateway 112A may transmit a probe via first virtual uplink 724 using a high availability (HA) virtual local area network (VLAN) with an interval of one second and one or more retry attempts may follow to constitute a virtual uplink tunnel "heartbeat."

At block 820, first gateway 112A may be reachable from a local cluster manager (or when the cluster manager is implemented remotely), which is identified as a response from the probe request, but not may not be reachable by second gateway 112B. In this example, second gateway 112B may not transmit a reply to the probe request. The missing reply from second gateway 112B may be due to a disruption event, such as a gateway reload and may be detected from a cluster heartbeat failure. Cluster splits may occur and be detected within milliseconds, at least in part, by a cluster manager transmitting probe requests (or cluster heartbeats) aggressively in milliseconds (e.g., 900 ms) and listening for responses. A cluster split can immediately signify a reachability failure the LAN network. A cluster manager process may listen for cluster splits and may detect cluster splits within milliseconds of a split occurring.

In some examples, cluster heartbeat packets may travel through the same downstream LAN switch as described herein, including first HA VLAN 728 or second HA VLAN 730 of switch 162, similar to the first HA VLAN 328 or second HA VLAN 330 of FIG. 3. Running cluster heartbeats in milliseconds may ensure early detection and correction of issues to maintain high availability of LAN traffic. This cluster heartbeat process may enable fast identification of a disruption event with one or more of the devices in the cluster 700.

At block 830, the cluster manager may detect the network issue (e.g., cluster split or other communication error) and notify the uplink manager of the non-affected device, first gateway 112A, by generating and transmitting an error message. The notification to the uplink manager may identify the cluster split affecting second gateway 112B.

At block 832, based on the non-responsive first virtual uplink 724, various operations may be performed, either concurrently or serially. For example, uplink manager at first gateway 112A may immediately suspend virtual uplink (e.g., the LAN connection to second gateway) as unreachable. In some examples, uplink manager at first gateway 112A may notify FPAPPS to remove the route to second gateway 112B (e.g., via virtual uplink).

At block 834, uplink manager at first gateway 112A may immediately suspend the transmission of probes to other devices in the cluster 700. For example, the uplink manager may stop the WAN health check via first virtual uplink 724 to second gateway 112B. In some examples, the uplink manager of first gateway 112A may notify the health check manager process to suspend its regular WAN health check probe of second gateway 112B based on the cluster split identified through the overlay tunnel. The WAN health check may be transmitted over the virtual uplink 724, which is identified as non-responsive. The notification instructing the suspension of this WAN health check may be sent immediately upon confirmation of the connection loss via the cluster manager. This may conserve resources because processing WAN details is not necessary if a LAN failure has occurred. Other processes may be started or stopped as well.

At block 840, uplink manager at first gateway 112A may update the default gateway to remove second gateway 112B and utilize an alternative connection to Internet 170. The suspension may be based on the non-responsive LAN connection (using the established cluster 700) to access second ISP 132 through second gateway 112B, which also provides access to Internet 170.

In some examples, the new default gateway may point to the first physical uplink 720. The suspension of communications transmitted via first virtual uplink 724 may be implemented by notifying the FPAPPS process to remove any routes via the virtual uplink tunnel 724, without waiting for the HCM process (e.g., using the WAN ICMP probe that includes a first attempt, waiting ten seconds, repeating three times, etc.). As shown in Table 3 (for first gateway 112A), the reachability identifier of second gateway 112B may also be changed from "reachable" to "unreachable." In some examples, WAN health check may be suspended based on the second connection to Internet 170 identified via LAN.

Using the default gateway, first gateway 112A may continue to transmit communications with first ISP 130 on the first physical uplink 720 only, minimizing traffic loss that is expected via the first virtual uplink 724 to second ISP 132, which is unreachable due to the cluster split. The communications and other operations enabled by the creation of cluster 700 may stop. By continuing to transmit communications via first physical uplink 720, the uplink manager may execute a load balancing process with the remaining device to avoid packet loss. Load may be rebalanced within milliseconds of a detected failure. Rebalancing load at the millisecond level significantly reduces traffic loss. The uplink manager may, in addition to listening for notification from the cluster manager process, also listen for a virtual uplink tunnel heartbeat, and may listen to the uplink health check manager process.

Various advantages are realized through this process. For example, the process of utilizing the cluster heartbeat to determine a connection issue and stopping transmissions of WAN heartbeats can help confirm a failure sooner and re-route traffic accordingly. This may help eliminate traffic loss and allow the traffic load to be re-balanced sooner to prevent lengthy periods of traffic loss. As discussed herein, WAN health check timers are typically set with a higher frequency, such as about ten seconds, as discussed above, to accommodate packet loss. However, internal LAN networks do not pose the same packet loss and delay issues. Therefore, determining the loss in a LAN network instead of a WAN network may allow for more aggressive health checks. Faster determination a loss of the virtual uplink in the LAN network may allow for rebalancing of the load such that the virtual uplink is not used for uplink load balance, since use of the virtual uplink will result in failure.

Although the process described herein is implemented from first gateway 112A, a similar process may be implemented at second gateway 112B, which is also identifying that the second virtual uplink is down and first ISP 130 is unreachable (e.g., using both the WAN heartbeat probes and virtual uplink probes). This operation may be performed concurrently with the similar operation performed by first gateway 112A. For example, second gateway 112B may set a new default gateway using the second physical uplink, which may be a new default path to second ISP 132. In setting a new default gateway, second gateway 112B may suspend or stop WAN connections via second virtual uplink to first ISP 130, thus removing first gateway 112A as the default gateway (e.g., using the FPAPPS process) so that no traffic is transmitted via that connection. As shown in Table 3 (for second gateway 112B), the reachability identifier of first gateway 112A may also be changed from "reachable" to "unreachable."

At block 850, the cluster manager may continue to attempt to reestablish connections, for example, at block 850A when cluster manager is internal to first gateway 112A and also with block 850B for second gateway 112B using the cluster heartbeat process. In other words, the WAN HCM heartbeats may be stopped but the cluster heartbeat process may continue through the non-responsive period of time. The cluster health check process may be executed to transmit one or more probes through a working LAN connection in accordance with a retry interval (e.g., on the millisecond level) while the first gateway 112A in the cluster 700 continues to send data packet transmissions through first physical uplink 720 without relying on the communication features of the cluster (e.g., first virtual uplink 724). In some examples, the cluster manager at first gateway 112A may notify the uplink manager after a detected cluster split and a sustained cluster split following a retry interval. In some example, the cluster manager at first gateway 112A may continue to listen for second gateway 112B to respond to cluster heartbeats in accordance with a time interval and one or more retry attempts that are configurable by one or more orchestrators.

As an illustrative example, cluster manager may send a cluster heartbeat probe at a set period on the millisecond level to second gateway 112B. The set period may be every 96 milliseconds. The set period may range up to 500 milliseconds in an embodiment. Therefore, if a probe is sent at 100 milliseconds and a reply is not received within 600 milliseconds, the lack of reply may indicate a probe failure. The probe failure may identify a cluster split.

At block 860, the cluster manager may receive one or more replies from gateways 112, including a reply from first gateway 112A (block 860A) and detecting that second gateway 112B has successfully rejoined the communication network after some amount of time (block 860B). Detecting that the second gateway 112B has rejoined may indicate that the first virtual uplink 724 is now reachable (and update Table 3 from "unreachable" to "reachable").

At block 862, the cluster manager may detect that the heartbeat from the WAN health check is restored via first virtual uplink 724 with the second gateway 112B (outside of the cluster heartbeat process). The cluster manager may immediately notify the uplink manager of first gateway 112A. Detecting that the heartbeat has restored may indicate that the first virtual uplink 724 is now reachable.

The uplink manager may notify the FPAPPS process to add back a default gateway to second gateway 112B by first gateway 112A (using virtual uplink 724). With multiple default gateways, via both the physical uplink and virtual uplink, the traffic load may be balanced again. Additionally, the uplink health check manager process may be reinstated for all paths (e.g., first physical uplink 720 and first virtual uplink 724). By adding the additional data paths, the FPAPPS process may implement load balancing by sending packets over both the first physical uplink 720 and first virtual uplink 724 again (e.g., via second gateway 112B).

At block 870 (illustrated as first block 870A to first gateway 112A and second block 870B to second gateway 112B), cluster manager may automatically create the cluster again with first gateway 112A and second gateway 112B. For example, upon detecting second gateway 112B rejoining the communication network, indicating that the virtual uplink 724 is now reachable, the cluster manager may also notify the uplink manager of first gateway 112A of the healthy status of second gateway 112B. Cluster manager may also instruct the WAN health check probes to be restarted from first gateway 112A for the virtual uplink 724 to second ISP 132 via second gateway 112B.

The cluster 700 may recover. Recovery of the cluster may indicate that the virtual uplink 724 is once again reachable. After this preliminary indication that the virtual uplink may be reachable, the virtual uplink may be monitored for a longer period of time to ensure stability. Once stability is ensured, the uplink manager may be notified that the virtual uplink is once again reachable. To confirm the virtual uplink is reachable, the health check manager of first gateway 112A may initiate a WAN health check probe for the virtual uplink 724 on the next scheduled probe interval slot for the physical uplink 720 to realign probe timing for the virtual uplink 724 with the physical uplink 720.

As described herein, the health check manager probe may run on both the physical uplink 720 and virtual uplink 724 per WAN health check probe configuration. The health check manager may receive ICMP replies for the ICMP probe sent over the virtual uplink if the virtual uplink 724 is reachable. The health check manager many then notify the uplink manager that the health check manager has confirmed the virtual uplink is once again reachable. Upon notification from the health check manager, the uplink manager may notify FPAPPS to once again add routes to the virtual uplink 724 for the load balance since the virtual uplink is reachable.

Figure 9:
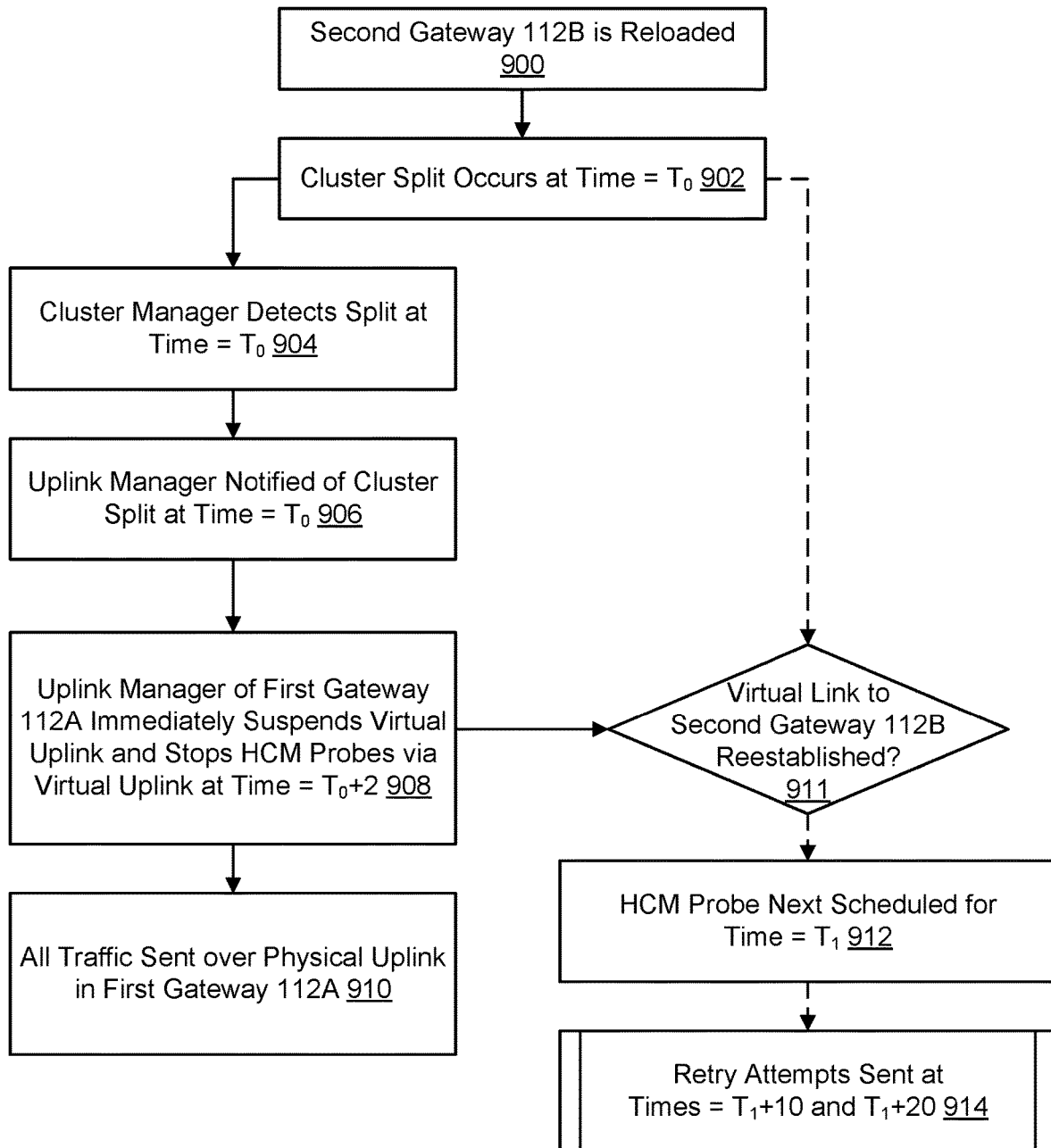
FIG. 9 is a flow diagram illustrating an example of cluster manager process in accordance with embodiments described herein.

An illustrative example is provided with FIG. 9, which shows the cluster manager instructing gateway traffic in response to a cluster split, for example.

At block 900, a cluster manager process may be needed to check virtual uplink reachability due to some event. This initial event may include several events which result in the loss of the virtual uplink. For example, one initial event may be that the second gateway is reloaded.

At block 902, a consequence may occur. The consequence may be that a cluster split occurs. The cluster split may occur at a time=$T_0$. Due to the initial event and the consequence, a cluster manager process may needed to determine whether the virtual uplink may be used to send traffic.

At block 904, the cluster manager process may detect a cluster split. The cluster split may occur a time=$T_0$. The cluster split may be detected within milliseconds of the occurrence. Therefore, for time in seconds, the cluster split may be detected at time=$T_0$.

At block 906, the uplink manager may be notified of the cluster split at time=$T_0$. This may be same time that the cluster split is detected by the cluster manager process.

At block 908, the uplink manager may immediately suspend virtual uplink traffic and may immediately stop the health check manager probe on virtual uplink at time=$T_0+2$.

At block 910, all traffic may be sent over the physical uplink 720 in the first gateway 112A, instead of over the virtual uplink 724 which is unreachable.

At block 911, the cluster manager may identify whether the virtual uplink is reestablished to second gateway 112B. If so, the HCM probes may be scheduled or restarted, since the second gateway 112B may be reachable by first gateway 112A or other cluster manager.

At block 912, the HCM process may optionally send the next scheduled probe. The next scheduled probe may be sent at time=$T_1$.

At block 914, retry attempts may be sent at a frequency of 10 seconds. Three total probes may be sent. After the initial probe sent at time=$T_1$, two additional probes may be sent at times=$T_1+10$ and $T_1+20$.

In some examples, blocks 912 and 914 are instructed to be removed in response to the identification of the cluster split and the cluster manager instructing the HCM at first gateway 112A not to perform this step. For example, if the virtual uplink cluster manager process, as described in the previous paragraph, is performed, the uplink manager may immediately suspend the HCM probe during block 908 at time=$T_0$. This may occur before the next scheduled HCM probe is sent, as in block 912. This may also occur before retry HCM probes are sent, as in block 914. Therefore, the potential operations 912, 914 may not be performed.

Figure 10:
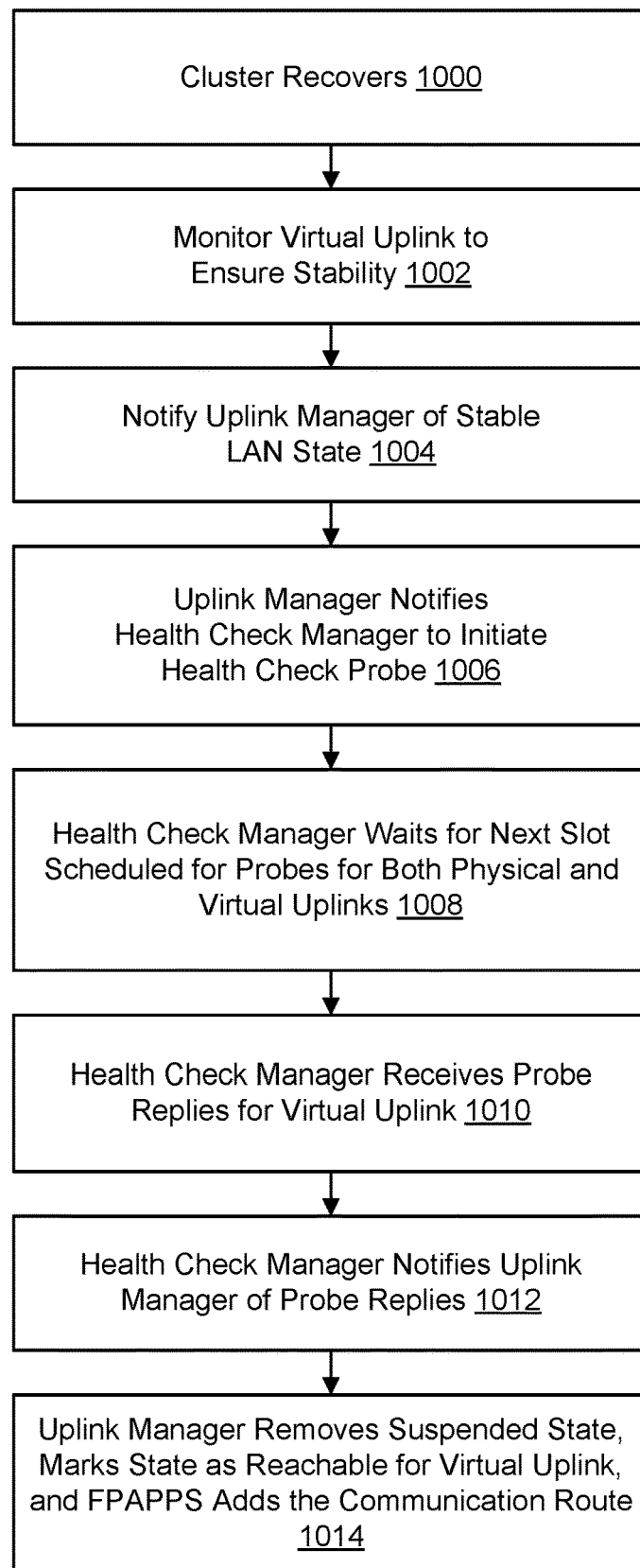
FIG. 10 is a flow diagram illustrating an example of cluster manager process in accordance with embodiments described herein.

FIG. 10 shows an example of a virtual uplink reachability confirmation process in accordance with the embodiments described above. The illustrative topology provided in FIG. 8 may perform the operations described herein.

At block 1000, a cluster may recover. Either of these events may signify that the virtual uplink is potentially reachable once again.

At block 1002, the virtual uplink 724 of first gateway 112A may be monitored to ensure that it is stable.

At block 1004, the uplink manager may be notified of the stable LAN state. A stable LAN state may occur when both the virtual and physical uplinks are reachable.

At block 1006, the uplink manager may notify the health check manager to initiate a health check probe.

At block 1008, the health check manager may wait for the next slot scheduled for probes for both the physical and virtual uplinks. Probes may be sent for both the physical and virtual uplinks at a set frequency. For example, probes may be sent every 10 seconds. If virtual uplink is lost, the health check manager may suspend probes for the virtual uplink and may continue to send probes for the physical uplink. Therefore, when the health check manager resumes sending probes for the virtual uplink, it may wait for the next schedule probe for the physical uplink so it can send the probes together.

At block 1010, after sending a probe, the health check manager may receive probe replies (e.g., ICMP request and reply probes) sent on the virtual uplink 724. The replies may confirm that the virtual uplink 724 is reachable.

At block 1012, the health check manager may notify the uplink manager of any probe replies. The probe replies may signify the virtual uplink 724 is reachable and that traffic may be sent over the virtual uplink 724 without loss.

At block 1014, the uplink manger may remove the suspended state designation for the virtual uplink 724 and may mark the virtual uplink 724 as reachable. Traffic load may then be balanced between the physical and virtual uplink.

In some examples, the FPAPPS process may add the communication route for the virtual uplink via second gateway 112B to second ISP 132 in Table 1, as shown herein.

Using Datapath Monitoring to Identify WAN and LAN Traffic Loss

Figure 11:
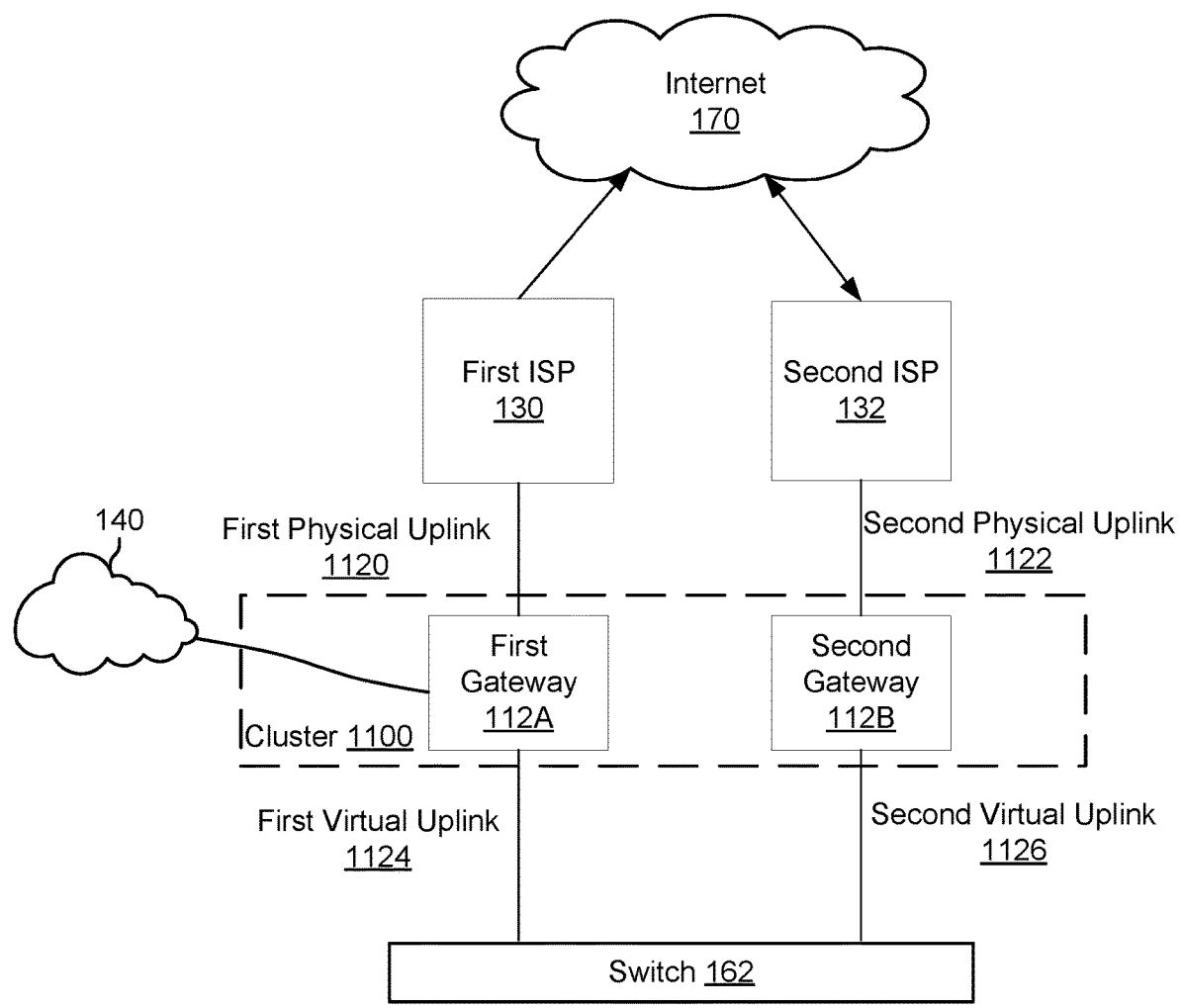
FIG. 11 is a diagram showing an example of a topology using datapath monitoring to remedy WAN or LAN traffic loss in accordance with embodiments described herein.

Gateways 112 typically monitor a datapath between two devices, including first gateway 112A and second ISP 132 via the virtual uplink or the first gateway 112A and the first ISP 130 for the physical uplink. The FPAPPS process can monitor each datapath and identify one or more routes to transmit data. FPAPPS process may be initiated by SD-WAN 140 via a connection between first gateway 112A, for example, and SD-WAN 140 (e.g., SD-WAN Orchestrator 144), as illustrated in the example topology in FIG. 11.

For example, first gateway 112A can identify one or more flags associated with a datapath between first gateway 112A and second gateway 112B, including a second virtual uplink 1126. When a first issue is identified, the datapath (second virtual uplink 1126) can be associated with a flag in a session table that identifies an issue has occurred. If the issue is resolved, the flag can be removed from the datapath in the table. If the flag is identified a second time for the same datapath, the datapath may be determined to have an issue and traffic from first gateway 112A to and second gateway 112B via second virtual uplink 1126 may be redirected to a different datapath, for example, first physical uplink 1120 to first ISP 130 or via an overlay tunnel when cluster 1100 is established between first gateway 112A to and second gateway 112B to access Internet 170 through second ISP 132.

Figure 12:
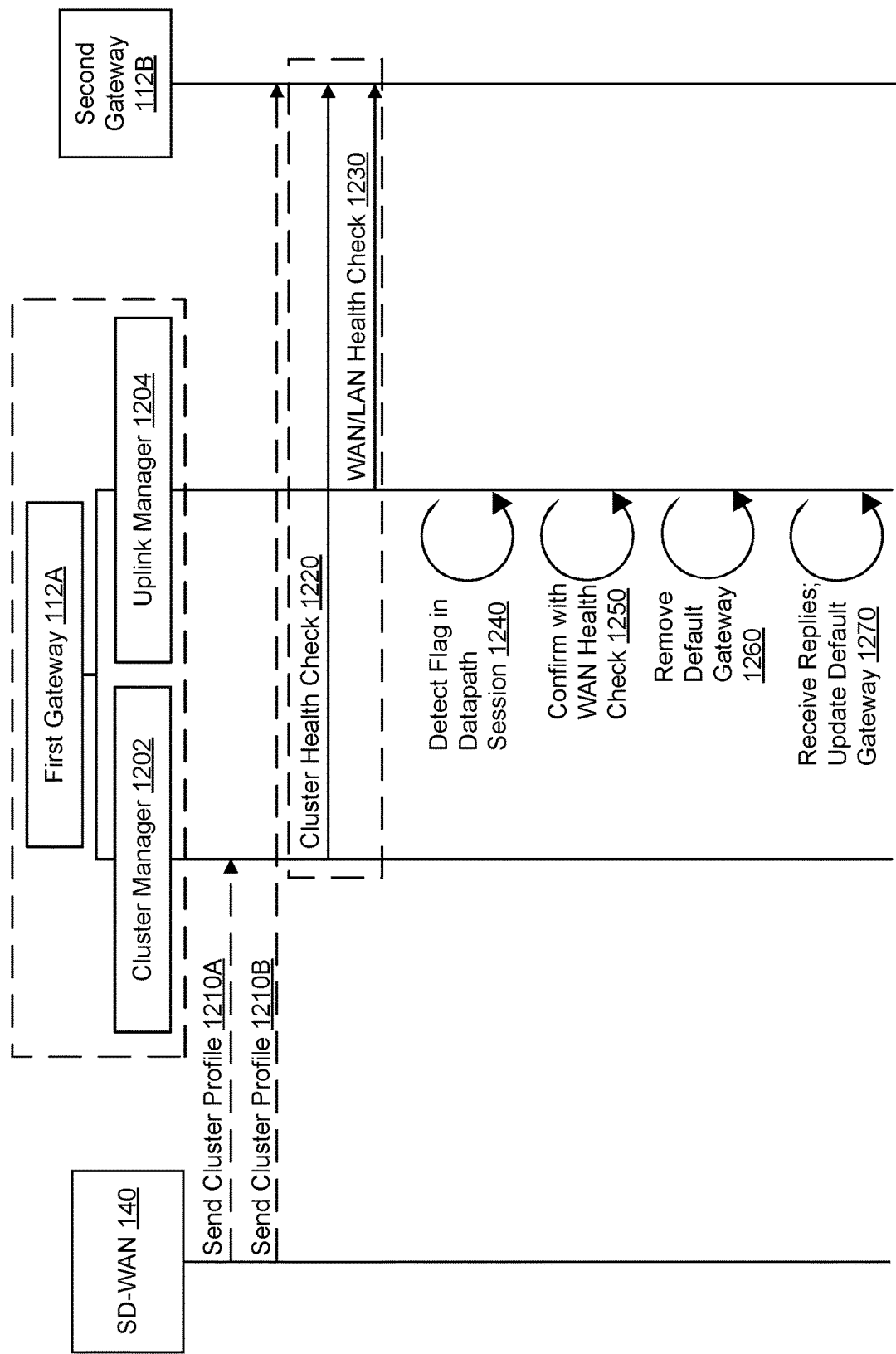
FIG. 12 shows an example process of using datapath monitoring to identify WAN or LAN traffic loss in accordance with the embodiments described above.

For illustrative purposes, first gateway 112A of FIG. 12 is illustrated with cluster manager 1202 and uplink manager 1204, although these components may be implemented in any of the examples of gateways described herein, including the topology of FIG. 7 and the process of FIG. 8. For example, first gateway 112A and second gateway 112B may both comprise a cluster manager (e.g., client agent) when the gateways receive cluster configuration settings transmitted from SD-WAN 140.

FIG. 12 shows an example process of using datapath monitoring to identify WAN or LAN traffic loss in accordance with the embodiments described above using the topology illustrated in FIG. 11.

At block 1210, SD-WAN 140 may transmit cluster profile and configuration settings to the one or more gateways to create the in the cluster of gateways 1100. The cluster may or may not be implemented in order to use the FPAPPS process described herein, but the process is not reliant on the formation of the cluster. As illustrated, the communications to form the cluster may be transmitted from SD-WAN 140 to first gateway 112A (block 1210A) and may be transmitted from SD-WAN 140 to second gateway 112B (block 1210B). First gateway 112A and second gateway 112B may form a cluster of gateways 1100 by receiving configuration settings to form each gateway's cluster manager from SD-WAN 140

(or other cloud-managed cluster process). The devices in the cluster may communicate via a LAN connection (e.g., IPSec or GRE tunnel via switch 162). When a cluster of gateways 1100 is formed, each of the devices in the cluster can handle traffic as a high-availability (HA) feature. If one device goes down, the other devices can perform operations in their place, for example, by running a heartbeat for peer devices in the cluster and transmitting the instruction to the second device in the cluster. One or more cluster heartbeat packets may be transmitted through same communication channels as a default gateway.

At block 1220, a cluster health check may be initiated. For example, when cluster of gateways 1100 is established, first gateway 112A may initiate a cluster health check with other devices in the cluster, including second gateway 112B. In the cluster health check, first gateway 112A may transmit one or more cluster health check probes to second gateway 112B and expecting a response within a threshold amount of time. The cluster health check may wait a threshold amount of time, which may be less than an amount of time expected in response to an cluster health check until the cluster health check can determine if second gateway 112B is down.

At block 1230, a WAN health check may be initiated. For example, first gateway 112A may initiate a HCM health check by transmitting one or more HCM probes to second gateway 112B and expecting a response within a threshold amount of time. The HCM health check may continue for a determined number of retry attempts until the HCM health check can determine if second gateway 112B is down.

In either of blocks 1220, 1230, first gateway 112A may monitor any packets sent across the datapaths between first gateway 112A and second gateway 112B, including LAN or WAN uplinks. A similar monitoring process may be implemented from second gateway 112B to track the same datapaths (not shown). When monitoring the datapaths, any packets transmitted from first gateway 112A via the virtual uplink 1124 to switch 162 or second gateway 112B may be associated with WAN traffic. The packets may include, for example, heartbeat probes, data packets, management packets, and other forms of data transmitted electronically. The reply packets transmitted via the virtual uplink 1124 may be tracked as well. If the reply packets are seen in the same session, the FPAPPS process may identify the reply packets and continue to monitor the datapath.

During WAN HCM health check of block 1230, the heartbeat probes may be periodically transmitted to second gateway 112B (e.g., IP 8.8.8.8). The default probe frequency can be 10 seconds and retry of 3 seconds. When probes are sent, datapath sessions may be created in the datapath uplink session table.

In some examples, the datapath uplink session table may maintain only sessions going to Internet 170 via a WAN connection. The configuration manager may create a forward and reverse session entry in the datapath uplink session table at the known frequency (e.g., 10 seconds).

At block 1240, uplink manager 1204 may detect one or more flags in the datapath uplink session table. For example, a forward session entry may be created every 10 seconds. If a reverse session is not seen, a flag may be added in datapath uplink session table. In this illustration, the "Y" flag is created and added to the table. However, since every forward session expects a reverse session in response (e.g., corresponding with request and response probes), the "Y" flag should not be seen. The same process can be followed for each retry attempt.

Various flags may be used to mark probes or other data packets transmitted by first gateway 112A, as illustrated in FIG. 13. One or more of these flags may be added to the packet header for a data path session. For example, "F" may refer to fast age of the packet, "S" may refer to source, "N" may refer to destination, "D" may refer to deny, "R" may refer to redirect, "Y" may refer to no synchronization, "H" may refer to high-priority, "P" may refer to set priority, "T" may refer to set ToS, "C" may refer to client, "M" may refer to mirror, "V" may refer to voice over IP (VOIP), "Q" may refer to real-time quality analysis, "u" (lowercase "U") may refer to upstream real-time quality analysis, "I" may refer to deep inspection, "U" (uppercase "U") may refer to locally destined, "E" may refer to media deep inspection, "G" may refer to media signal, "r" may refer to route hop, "h" may refer to high-value, "A" may refer to application firewall inspection, "i" (lowercase "I") may refer to session classified on first packet, "J" may refer to SD-WAN default probe stats used as fallback, "f" (lowercase "F") may refer to FEC enabled for the session, "X" may refer to SD-WAN exception, "x" (lowercase "x") may refer to translation, "B" may refer to permanent, "O" may refer to open flow, "L" may refer to log, "o" may refer to open flow configured revision mismatched, and "Z" may refer to session is redirected to IDPS.

An illustrative example of the data traffic is provided in FIG. 14. In this example, the source device corresponds with an IP address of 172.33.192.1 (e.g., first gateway 112A) may transmit packets to destination device that corresponds with an IP address of 8.8.8.8 (second gateway 112B). The FPAPPS process may monitor the transmissions on the datapath between the devices and generate the table showing the transmissions it marks in accordance with the flags.

For example, in first illustration 1400, when a packet includes "FCI," the packet may be associated with fast aging, may be client device traffic, and may be subject to a deep inspection. In second illustration 1410, when a packet includes "FYI," the packet may be associated with fast aging, may be associated with a client with synchronization to the destination device, and may be subject to a deep inspection.

When no probe reply is received from second gateway 112B (e.g., as a reverse session in the session table) within a threshold amount of time and the session is still active, the FPAPPS process may mark the probes with a flag identifying no synchronization between first gateway 112A via the virtual uplink 1124 to switch 160 or second gateway 112B (e.g., "Y" flag), as illustrated in second illustration 1410 of FIG. 14. That is, when first gateway 112A sends a probe to second gateway 112B and the FPAPPS process identifies that no probe reply from second gateway 112B is received by first gateway 112A, the next probe that first gateway 112A sends to second gateway 112B is marked with the "Y" flag.

In some examples, uplink manager 1204 of FIG. 12, the FPAPPS process can create a counter to determine the number of flags that are identified in a session. If the "Y" flag is seen, the counter may be incremented for each "Y" flag that occurs out of all retry attempts.

As an illustrative example, if packets are sent at 10.00.00, then the "Y" flag should not appear for all the probe packets sent at 10:00:00. If five probes are sent at 10:00:00 and if the "Y" flags appears for each of the five session, the uplink manager 1204 may determine that the reverse packets are not received.

At block 1250, uplink manager may cross check details with WAN HCM (e.g., when the counter exceeds a threshold value). If WAN HCM does not identify the same communication problem that is identified with missing responses, uplink manager may determine an error exists with the WAN health check process. An error message can be generated and transmitted for failure to detect missing probe replies during the WAN health check process.

In some examples, the WAN heartbeat probes transmitted during the WAN health check process may be suspended, as discussed herein, to remove the additional and unnecessary communications from the network. Some of the heartbeat probes may include the HCM heartbeats, which may be canceled because the connection with the device may be already identified through the flags in the datapath uplink session table.

At block 1260, the default gateway may be updated to remove second gateway 112B, as described herein.

At block 1270, uplink manager 1204 may receive probe replies from second gateway 112B. When the probe replies are received, the "Y" flags may be removed from the datapath uplink session table and the second gateway 112B may be reestablished as the default gateway.

In some examples, a cluster is established with first gateway 112A and second gateway 112B. In this example, the uplink manager 1204 of first gateway 112A may expect to identify the probe reply in any of the health check processes described herein, including cluster health check, WAN health check, or LAN heartbeat. Each of these health checks may operate in a different session that is stored in a session table by uplink manager 1204 and flags may be assigned to each one of these sessions. If the probe reply is not received within the threshold amount of time, uplink manager 1204 may detect a delay in the transmission of the probe reply for that session. In another example, uplink manager 1204 may expect to identify the probe reply within a session. If the response packets are not identified for the same session, uplink manager 1204 may detect a delay in the transmission of the response packet. In either example, the absence of the probe reply may indicate a potential uplink loss, either based on a dropped connection or dropped device. To confirm, the FPAPPS process may mark the probes with a flag or identifier.

In some examples, uplink manager 1204 may initiate a default gateway change, as described herein, within the established cluster. Uplink manager 1204 may notify cluster manager 1202 to initiate the default gateway change, as described herein. When no cluster is established, uplink manager 1204 may initiate the default gateway change by removing the gateway from the DHCP table of the affected gateway or otherwise updating the route path for sending or receiving data (e.g., using a FPAPPS process to identify the route to transmit data).

In some examples, once the session is marked as non-responsive by the uplink manager 1204, uplink manager 1204 can check the virtual uplink between first gateway 112A and second gateway 112B in one or more ways. When a cluster is established between first gateway 112A and second gateway 112B, FPAPPS may check status of the datapath from cluster manager 1202. The cluster manager 1202 may be aware of a potential loss, as indicated by a cluster split, described herein. In another example, FPAPPS process can check the status of the virtual uplink by communicating directly with the uplink manager 1204 of first gateway 112A or second gateway 112B (e.g., via virtual uplink engine 220 or other uplink manager) to aggressively check heartbeat probe replies. Outcome of receiving or not receiving each heartbeat probe reply can be transmitted to the uplink manager to adjust the default connection from the virtual uplink to the physical uplink.

In some examples, upon suspending the LAN connection and the WAN health check, cluster manager 1202 may continue to attempt to reestablish connections with the second cluster device (e.g., using probes or cluster heartbeat process). When a response to the cluster heartbeat is received from the second gateway, cluster manager 1202 may reform the cluster of gateway devices with the second gateway device (e.g., since it was able to generate and transmit a response to the attempts to reestablish the connection).

In some examples, in response to either the uplink manager 1204 or the cluster manager 1202 changing the default gateway, the datapath of data transmissions may be updated to communicate with a different ISP. For example, the datapath may be changed from virtual uplink 1124 to physical uplink 1120 to first ISP 130.

In some examples, the sources of the uplink connection status may be associated with a priority. For example, the FPAPPS process may identify an virtual uplink issue and notify uplink manager 1204 at first gateway 112A. If the uplink manager 1204 has not detected the same uplink issue, uplink manager 1204 may default to accepting the uplink issue identified by the FPAPPS process as having higher priority than the process performed at first gateway 112A (e.g., the HCM status check). In some examples, the FPAPPS process that identifies the uplink connection status of gateways 112 may be more reliable than an HCM status check at the individual gateways to identify an uplink issue.

In some examples, the cluster manager 1202 or uplink manager 1204 may notify the SD-WAN 140 (e.g., Overlay Tunnel Orchestrator 142 of SD-WAN 140) that the cluster or uplink connections are down.

Additional heartbeat and health probes may be stopped or restarted, as described throughout the disclosure, in response to the identification of the faulty connection. Suspension of these processes may help reduce the amount of traffic transmitted in the network and decrease the amount of traffic that is lost from a faulty connection.

A threshold number of retry values during a session or session timeout values may be configured at a user interface (e.g., by an administrative user). After a threshold number of attempts to receive a reply to the probe during a session, the HCM status check may be stopped or suspended. As an illustrative example, the HCM status check may correspond with a frequency value of one second and the retry value of three seconds. The session monitoring can be implemented using the HA VLAN connection or virtual uplink 1124 using a faster frequency or retry value, like a frequency value of 900 milliseconds and the retry value of three seconds. When using the virtual uplink 1124 and stopping the HCM status check, the timeout value can be set to a faster value using the virtual uplink 1124 than the timeout value than the HCM status check. The session may stay open until the session time exceeds the timeout value.

In some examples, the identification of the broken uplink identified in one session may be compared with data identified in a second session, for verification purposes. For example, a cluster health check probe with a missing reply probe may be compared to the data received from the HCM health check that are running between first gateway 112A and second gateway 112B.

This confirmation of a broken uplink process utilizing the FPAPPS process is much faster than a typical WAN connection relying on the HCM. For example, HCM heartbeat probes may be transmitted in accordance with a probe interval of ten seconds with three retry attempts, and connectivity failures may be confirmed only after three consecutive probes. This means the first gateway could lose WAN traffic over the virtual uplink during this time (e.g., waiting for the conclusion of the retry attempts). Conversely, by utilizing the FPAPPS process with flagging potential issues in the datapaths, when the probe reply is not received within a threshold period of time, the FPAPPS can transmit an instruction to the first gateway 112A to adjust the default connection from the virtual uplink to the physical uplink.

Example Computing Components and Implementations

Implementing one or more of the proposed embodiments may significantly reduce packet loss on the virtual uplink if the virtual uplink becomes unreachable due to an event such as an unplanned reload, a cluster split, or other event. For instance, leveraging a virtual uplink tunnel heartbeat may limit traffic loss to a period of just over three seconds and reduce the amount of data packets that are sent over the network when the system has identified an issue with an uplink or device that prevents other devices from receiving those data packets. Implementing any of the processes or systems described herein may reduce traffic loss to a period of milliseconds and also reduce the amount of traffic that is transmitted. For example, once a virtual uplink is confirmed as unreachable, there is no need to wait for the health check manager process, which may take nearly 40 seconds to confirm a loss of the virtual uplink. The virtual uplink may be immediately and proactively suspended, probes that would be transmitted in traditional systems over the virtual uplink may be canceled, stopped, or suspended, and other necessary traffic may continue over only the physical uplink, which is still operational. Because traffic may be sent over the physical uplink, there is no need to compromise the remaining traffic over the network.

Figure 15:
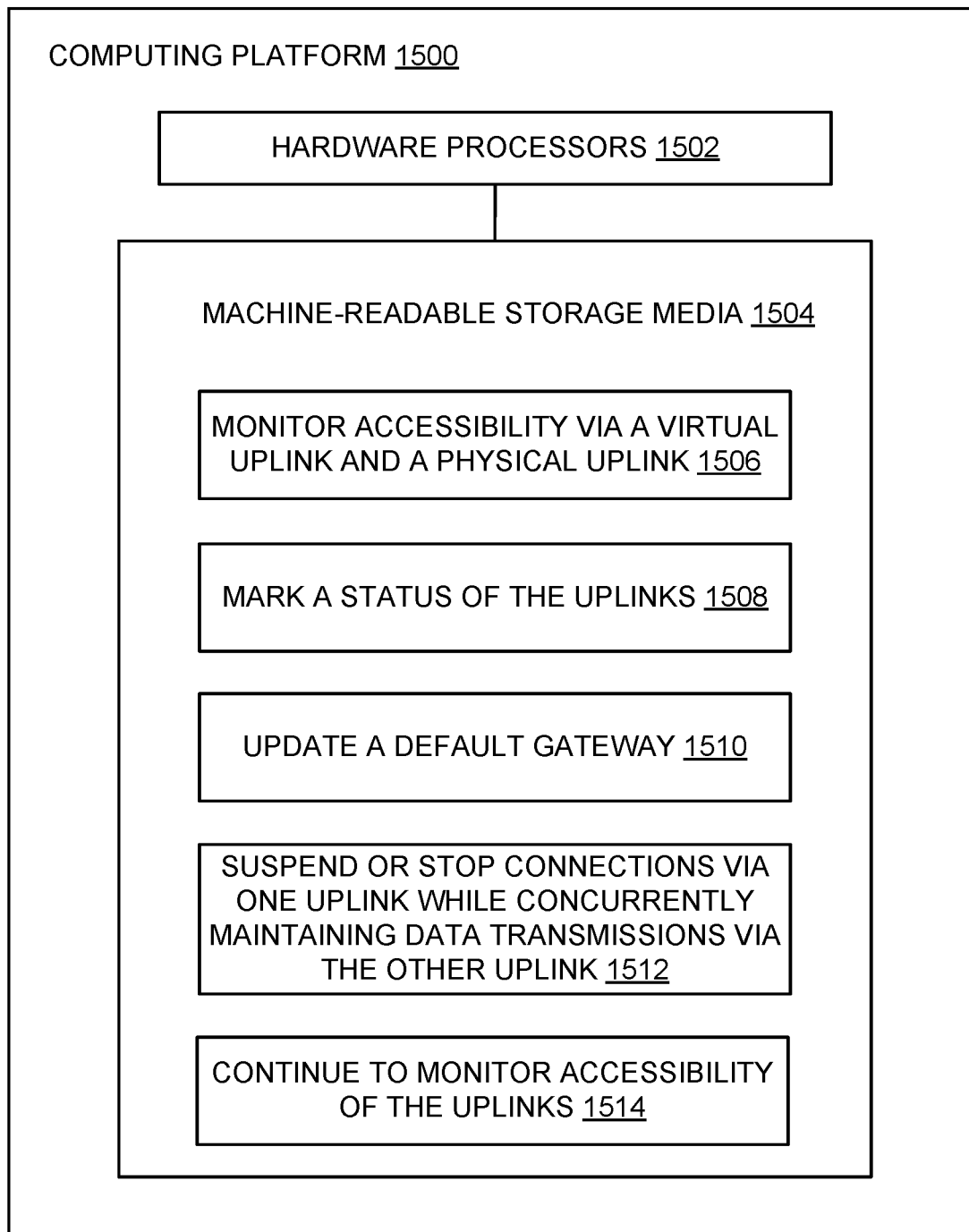
FIG. 15 is an example computing component that may be used to implement various features of embodiments described in the present disclosure.

FIG. 15 illustrates an example computing component that may be used to implement various methods and systems described herein. In this illustration, computing platform 1500 may be, for example, a server computer, a controller, or any other similar computing component capable of processing data. In the example implementation of FIG. 15, the computing platform 1500 includes a hardware processor 1502, and machine-readable storage medium 1504.

Hardware processor 1502 may be one or more central processing units (CPUs), semiconductor-based microprocessors, and/or other hardware devices suitable for retrieval and execution of instructions stored in machine-readable storage medium 1504. Hardware processor 1502 may fetch, decode, and execute instructions described throughout the disclosure. As an alternative or in addition to retrieving and executing instructions, hardware processor 1502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1504, may be any electronic, magnetic, optical, or other physical storage device that contains or stores executable instructions. Thus, machine-readable storage medium 1504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1504 may be a non-transitory storage medium, where the term "non-transitory" does not encompass transitory propagating signals. As described in detail below, machine-readable storage medium 1504 may be encoded with executable instructions, such as the instructions 1506-1514 described above.

Hardware processor 1502 may execute instruction 1506 to monitor the accessibility from the gateway to a network. For example, the gateway device may monitor accessibility to a network via a physical uplink and via a virtual uplink using a health check manager (HCM) process. In some examples, the gateway device monitors the accessibility by sending a first Internet Control Message Protocol (ICMP) probe from the gateway device over the physical uplink to a first ISP and sending a second ICMP probe from the gateway device over the virtual uplink to a switch and then to a second gateway. The accessibility to a device via each uplink can be determined by receiving one or more replies from the first ISP or the second gateway via each uplink, as illustrated in FIGS. 3-4.

Hardware processor 1502 may execute instruction 1508 to mark a status of the uplinks. For example, the gateway device may identify whether each of the uplinks are reachable or not. This may be based on, for example, when a response to the HCM process is received via the virtual uplink and not via the physical uplink within a threshold period of time. The gateway device can mark a status of the virtual uplink as reachable and a status of the physical uplink as unreachable.

Hardware processor 1502 may execute instruction 1510 to update a default gateway. For example, the gateway device may update a default gateway to the virtual uplink and remove the physical uplink. The default gateway may utilize the virtual uplink to maintain data transmissions to the network from the gateway device.

Hardware processor 1502 may execute instruction 1512 to suspend or stop connections to one uplink while concurrently maintaining data transmission via a different uplink. For example, the gateway device may suspend or stop connections via the physical uplink to remove the data transmissions to the network from the gateway device via the physical uplink while concurrently maintaining data transmissions to the network from the gateway device via the virtual uplink.

Hardware processor 1502 may execute instruction 1514 to continue to monitor the accessibility of the uplinks. For example, the gateway device may continue to monitor the accessibility to the network from the gateway device via the physical uplink by listening for a physical uplink tunnel heartbeat from the physical uplink.

Figure 16:
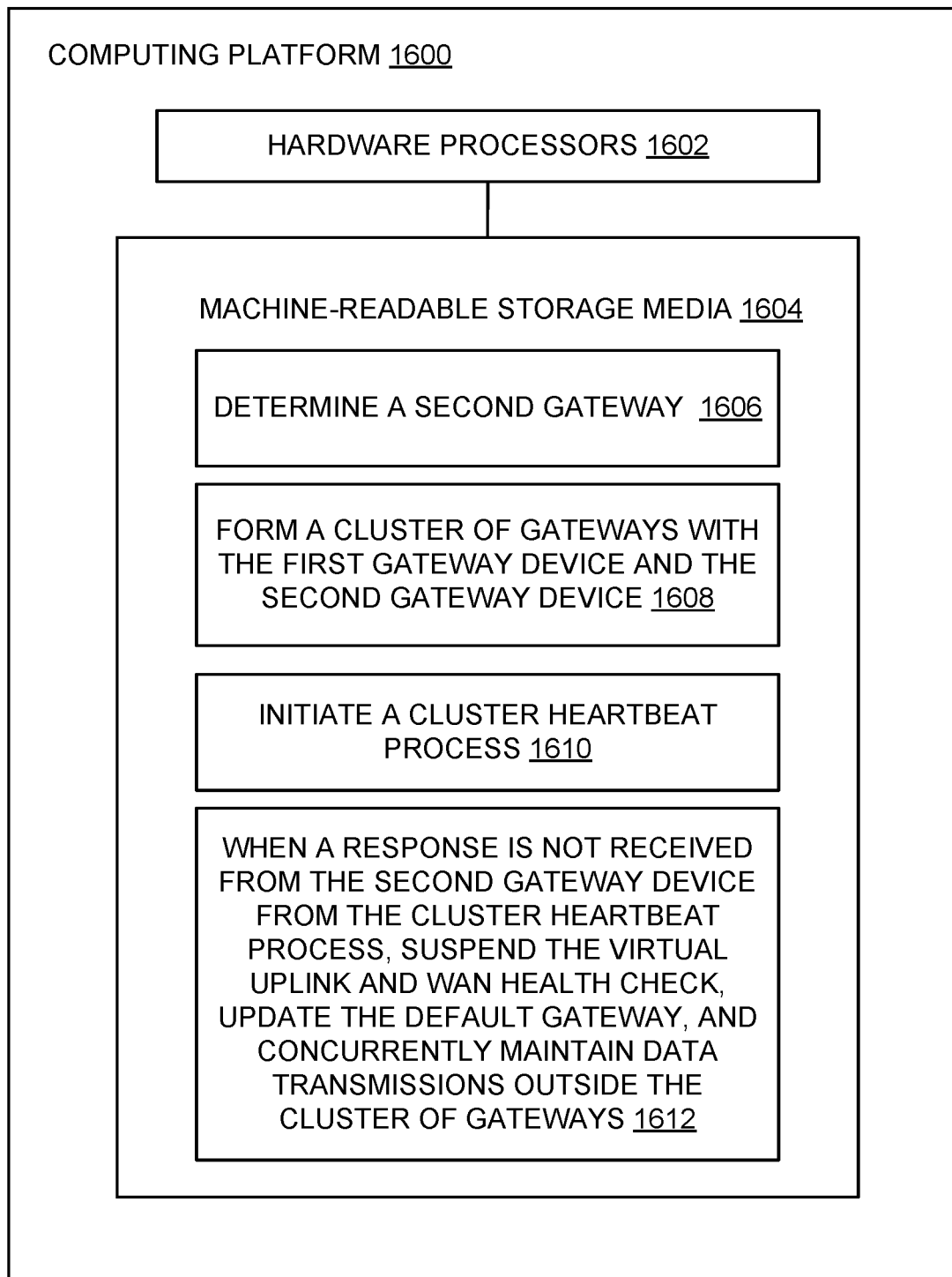
FIG. 16 is an example computing component that may be used to implement various features of embodiments described in the present disclosure.

FIG. 16 illustrates an example computing component that may be used to implement various methods and systems described herein. In this illustration, computing platform 1600 may be, for example, a server computer, a controller, or any other similar computing component capable of processing data. In the example implementation of FIG. 16, the computing platform 1600 includes a hardware processor 1602, and machine-readable storage medium 1604. In some examples, computing platform 1600 is a first gateway device.

Hardware processor 1602 may be one or more central processing units (CPUs), semiconductor-based microprocessors, and/or other hardware devices suitable for retrieval and execution of instructions stored in machine-readable storage medium 1604. Hardware processor 1602 may fetch, decode, and execute instructions described throughout the disclosure. As an alternative or in addition to retrieving and executing instructions, hardware processor 1602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1604, may be any electronic, magnetic, optical, or other physical storage device that contains or stores executable instructions. Thus, machine-readable storage medium 1604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1604 may be a non-transitory storage medium, where the term "non-transitory" does not encompass transitory propagating signals. As described in detail below, machine-readable storage medium 1604 may be encoded with executable instructions, such as the instructions 1606-1612 described above.

Hardware processor 1602 may execute instruction 1606 to determine a second gateway. The second gateway may be communicatively connected to the first gateway device via a virtual uplink over a local area network (LAN) connection, where the first gateway device enables a physical uplink to a first network accessible via an internet service provider (ISP) of the first gateway device and the second gateway device enables the virtual uplink over the LAN connection for the first gateway device to connect to a second network accessible via an ISP of the second gateway device.

Hardware processor 1602 may execute instruction 1608 to form a cluster of gateways with the first gateway device and the second gateway device. In some examples, the cluster of gateway devices may be formed between the first gateway device (e.g., computing platform 1600) and a second gateway device. The cluster of gateway devices may be formed via a cluster manager located at a cloud-based software-defined WAN (SD-WAN) or internally to the first gateway device. The first gateway device and the second gateway device may communicate via the LAN connection in addition to the virtual uplink to each ISP.

Hardware processor 1602 may execute instruction 1610 to initiate a cluster heartbeat process. For example, using the cluster manager, the first gateway may initiate a cluster heartbeat process to the second gateway via the LAN connection.

Hardware processor 1602 may execute instruction 1612 to when a response is not received from the second gateway device from the cluster heartbeat process, suspend the virtual uplink and WAN health check, update the default gateway, and concurrently maintain data transmissions outside the cluster of gateways. In some examples, the virtual uplink is suspended as unreachable and the WAN health check transmitted via the virtual uplink to the second gateway device is also suspended. In some examples, the default gateway is updated to remove the virtual uplink and the first gateway device may utilize the physical uplink outside of the cluster of gateway devices as a default connection to the first network accessible via the ISP of the first gateway device. In some examples, the first gateway device may concurrently maintain data transmissions to the first network accessible via the ISP of the first gateway device from the physical uplink outside of the cluster of gateway devices.

Figure 17:
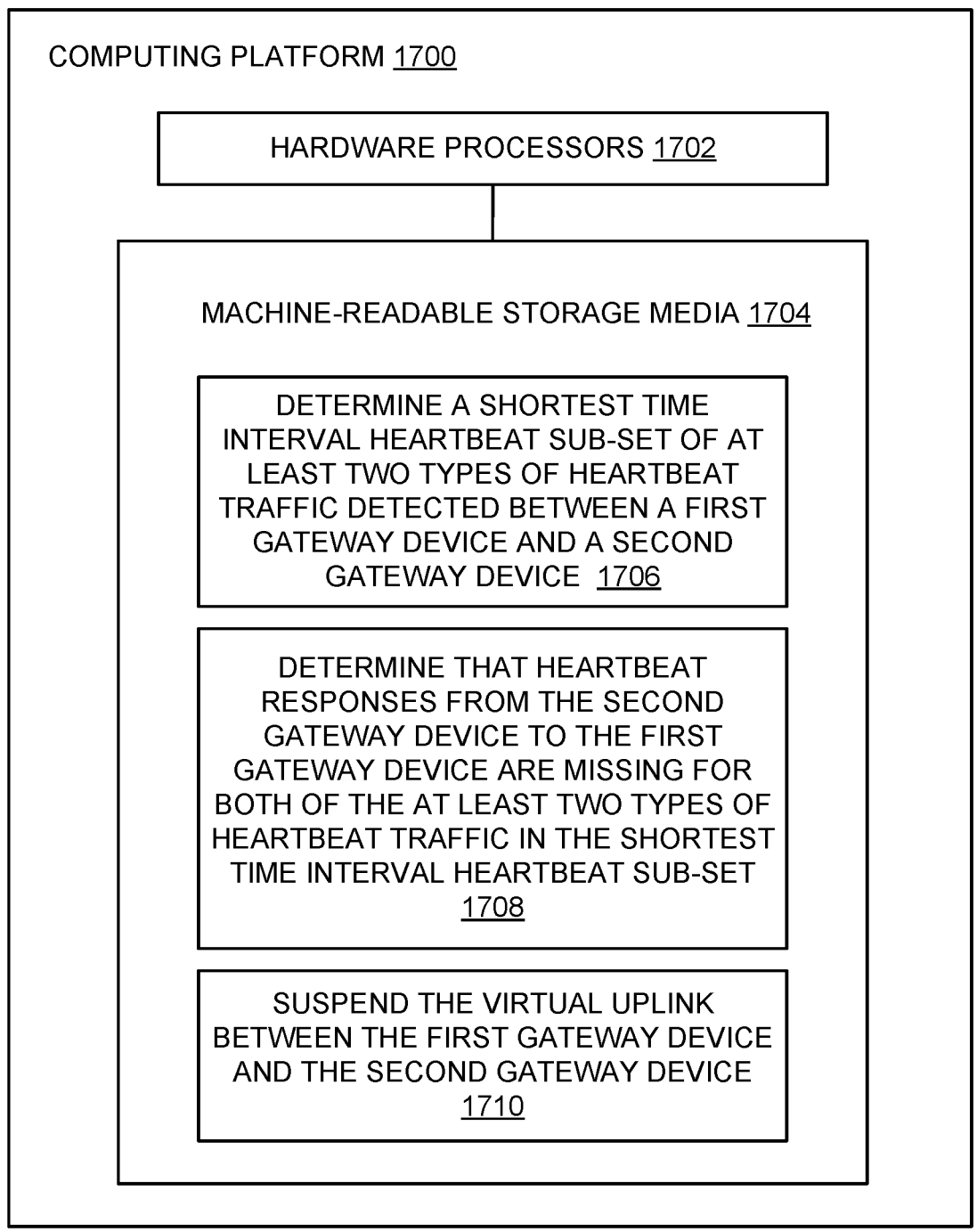
FIG. 17 is an example computing component that may be used to implement various features of embodiments described in the present disclosure.

FIG. 17 illustrates an example computing component that may be used to implement various methods and systems described herein. In this illustration, computing platform 1700 may be, for example, a server computer, a controller, or any other similar computing component capable of processing data. In certain examples, computing platform 1700 may be implemented in whole or in part in at least one of a first gateway device and a second gateway device (to be described below). In some examples, computing platform 1700 may be implemented in whole or in part in a cloud-based application/platform. In certain examples, computing platform 1700 may be implemented partially in at least one of a first gateway device and a second gateway device and partially in the cloud-based application/platform.

In the example implementation of FIG. 17, the computing platform 1700 includes a hardware processor 1702, and machine-readable storage medium 1704.

Hardware processor 1702 may be one or more central processing units (CPUs), semiconductor-based microprocessors, and/or other hardware devices suitable for retrieval and execution of instructions stored in machine-readable storage medium 1704. Hardware processor 1702 may fetch, decode, and execute instructions described throughout the disclosure. As an alternative or in addition to retrieving and executing instructions, hardware processor 1702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1704, may be any electronic, magnetic, optical, or other physical storage device that contains or stores executable instructions. Thus, machine-readable storage medium 1704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 1704 may be a non-transitory storage medium, where the term "non-transitory" does not encompass transitory propagating signals. As described in detail below, machine-readable storage medium 1704 may be encoded with executable instructions, such as the instructions 1706-1716 described above.

Hardware processor 1702 may execute instruction 1706 to determine a shortest time interval heartbeat sub-set of at least two types of heartbeat traffic detected between a first gateway device and a second gateway device. The first gateway device may be communicatively connected to the second gateway device via a virtual uplink over a local area network (LAN) connection. The at least two types of heartbeat traffic in the shortest time interval heartbeat sub-set may have the shortest time intervals among types of heartbeat traffic detected between the first gateway device and the second gateway device. In certain examples the first gateway device and the second gateway device may comprise a cluster of gateway devices and one of the at least two types of heartbeat traffic in the shortest time interval heartbeat sub-set may comprise a cluster heartbeat (as alluded to above, the time interval between cluster heartbeats may be on the scale of milliseconds). In some examples, the first gateway device may enable a physical uplink to a first network accessible via an internet service provider (ISP) of the first gateway device and the second gateway device may enable the virtual uplink over the LAN connection for the first gateway device to connect to a second network accessible via an ISP of the second gateway device.

As examples of the present technology are designed in appreciation of, different types of heartbeat traffic (e.g., vrrp advertisement heartbeat probes and responses, gre heartbeat probes and responses, cluster heartbeat probes and responses, branch gateway peer tunnel heartbeat probes and responses, etc.) may have different time intervals between heartbeats. As alluded to above, examples of the present technology can achieve faster/more responsive LAN health checks by leveraging heartbeats having shorter time intervals (e.g., millisecond scale time intervals vs. 10 second time intervals) for LAN health checks. Accordingly, by determining the shortest time interval heartbeat sub-set of the at least two types of detected heartbeat traffic, hardware processor 1702 can improve speed/efficiency for conducting LAN health checks.

Hardware processor 1702 may execute instruction 1708 to determine that heartbeat responses from the second gateway device to the first gateway device are missing for both of the at least two types of heartbeat traffic in the shortest time interval heartbeat sub-set.

In some examples, this may comprise monitoring forward session entries and reverse session entries of a data session table to detect that reverse session entries associated with the first and second gateway devices and both of the at least two types of heartbeat traffic in the shortest time interval heartbeat sub-set are flagged as unsynchronized with forward session entries. As alluded to above, the data session table may comprise a table/representation that logs heartbeat probes and responses between the first and second gateway devices (e.g., the data session tables depicted in conjunction with illustrations 1400 and 1410 of FIG. 14). In various examples, FPAPPs running on at least one of the first gateway device and the second gateway device may maintain the data session table including flagging reverse session entries as synchronized versus unsynchronized. Forward session entries of the data session table may be associated with heartbeat probes sent from the first gateway device to the second gateway device and reverse session entries of the data session table may be associated with heartbeat responses (indicating receipt of a heartbeat probe) sent from the second gateway device to the first gateway device. When a heartbeat response from the second gateway device is detected, the heartbeat response may be logged as a "synchronized" reverse session entry associated with a forward session entry/heartbeat probe. However, when no heartbeat response is detected for a given heartbeat probe/forward session entry, an "unsynchronized" reverse session entry may be logged in the data session table representing the "missing" heartbeat response (i.e., indicating that no heartbeat response was detected for the given heartbeat probe/forward session entry). As alluded to above, the "missing" heartbeat response may arise from a LAN health-related issue impacting the virtual uplink between the first gateway device and the second gateway device—which in turn may impact transmission of the heartbeat probe to the second gateway device (resulting in no heartbeat response being sent by the second gateway device) and/or transmission of the "missing" heartbeat response from the second gateway device to the first gateway device.

It may also be noted that hardware processor 1702 determines that heartbeat responses from the second gateway device to the first gateway device are missing for both of the at least two types of heartbeat traffic in the shortest time interval heartbeat sub-set. This feature can better ensure that the determined missing heartbeat responses arose from a LAN-health related issue impacting the virtual uplink between the first gateway device and the second gateway device—as opposed to an issue with one of the types of heartbeat traffic. That is, if the shortest time interval heartbeat sub-set were to comprise just a single type of heartbeat traffic, it would be more difficult for hardware processor 1702 to determine whether a determined missing heartbeat response arose from a LAN-health related issue impacting the virtual uplink between the first gateway device and the second gateway device versus an issue with the type of heartbeat traffic (e.g., an issue with cluster heartbeat probe responses). By contrast, it may be less likely that at least two types of heartbeat traffic are experiencing concurrent non-LAN health-related issues. Thus if hardware processor 1702 determines that heartbeat responses are missing for both of the at least two types of heartbeat traffic in the shortest time interval heartbeat sub-set, it is more likely that the determined missing heartbeats are caused by a LAN-health related issue impacting the virtual uplink between the first gateway device and the second gateway device. For the reasons stated above, hardware processor 1702 determines that heartbeat responses from the second gateway device to the first gateway device are missing for both of the at least two types of heartbeat traffic in the shortest time interval heartbeat sub-set. In certain examples, taking this into consideration, hardware processor 1702 can reduce the number of types of heartbeat traffic in the shortest time interval heartbeat sub-set (to e.g., 2 or 3 types) in order to improve computational efficiency/speed. That is, hardware processor 1702 can save processing resources by reducing the shortest time interval heartbeat sub-set in size (to e.g., 2 or 3 types).

As alluded to above, when hardware processor 1702 determines that one or more heartbeat responses are missing for just one of the at least two types of heartbeat traffic in the shortest time interval heartbeat sub-set, hardware processor 1702 may determine that the missing heartbeat response(s) arose from a heartbeat-related issue impacting that type of heartbeat traffic (e.g., there may be an issue impacting only cluster heartbeats). Here, again, hardware processor 1702 may determine that the missing heartbeat response(s) were not caused by a LAN health-related problem impacting the virtual uplink between the first gateway device and the second gateway device because no heartbeat responses are missing for the other type of heartbeat traffic. Accordingly, in cases where hardware processor 1702 determines that one or more heartbeat responses are missing for just one of the at least two types of heartbeat traffic in the shortest time interval heartbeat sub-set, hardware processor 1702 can send an alarm indicating that there is a heartbeat related problem for that type of heartbeat traffic.

Upon determining that the heartbeat responses from the second gateway device to the first gateway device are missing for both of the at least two types of heartbeat traffic in the shortest time interval heartbeat sub-set, hardware processor 1702 may execute instruction 1710 to suspend (e.g., as unreachable) the virtual uplink between the first gateway device and the second gateway device. In some examples, upon suspending the virtual uplink hardware processor 1702 may: (1) update a default gateway to remove the virtual uplink and utilize the physical uplink as a default connection to the first network accessible via the ISP of the first gateway device (as described above); and (2) concurrently maintain data transmissions to the first network accessible via the ISP of the first gateway device from the physical uplink (as described above). In this way, the (determined) faulty virtual uplink between the first gateway device and the second gateway device can be avoided until LAN health is restored.

In certain examples, after suspending the virtual uplink between the first gateway device and the second gateway device, hardware processor 1702 may restore the virtual uplink between the first gateway device and the second gateway device upon detecting a heartbeat response from the second gateway device to the first gateway device. As alluded to above, in some examples this may comprise monitoring forward session entries and reverse session entries of the data session table to detect that a reverse session entry associated with the first and second gateway devices is flagged as synchronized with a forward session entry.

Figure 18:
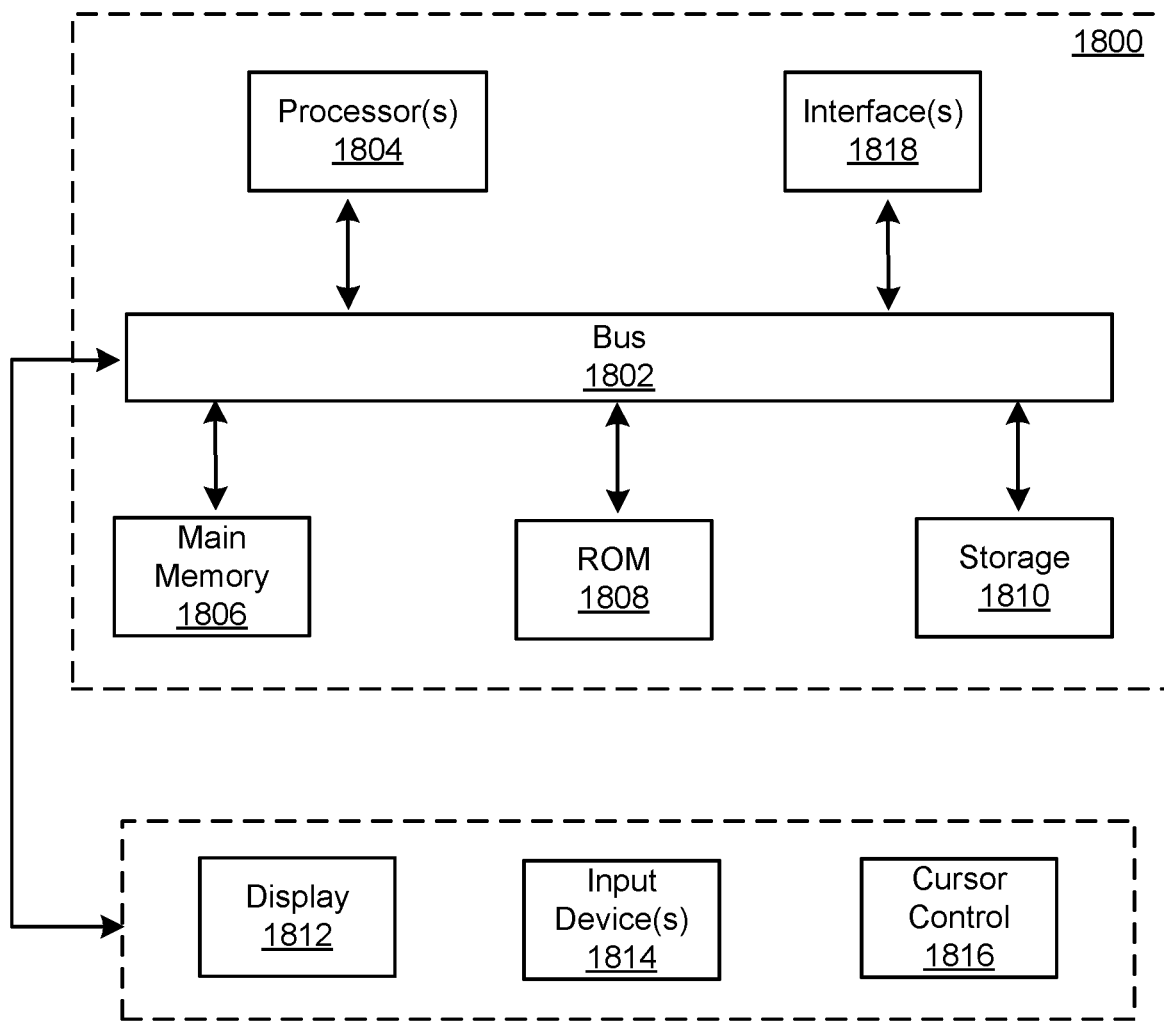
FIG. 18 is an example computing component that may be used to implement various features of embodiments described in the present disclosure.

FIG. 18 depicts a block diagram of an example computer system 1800 in which various of the embodiments described herein may be implemented. The computer system 1800 includes a bus 1802 or other communication mechanism for communicating information, one or more hardware processors 1804 coupled with bus 1802 for processing information. Hardware processor(s) 1804 may be, for example, one or more general purpose microprocessors.

The computer system 1800 also includes a main memory 1806, such as a random access memory (RAM), cache and/or other dynamic storage devices, coupled to bus 1802 for storing information and instructions to be executed by processor 1804. Main memory 1806 also may be used for storing temporary variables or other intermediate information during execution of instructions to be executed by processor 1804. Such instructions, when stored in storage media accessible to processor 1804, render computer system 1800 into a special-purpose machine that is customized to perform the operations specified in the instructions.

The computer system 1800 further includes a read only memory (ROM) 1808 or other static storage device coupled to bus 1802 for storing static information and instructions for processor 1804. A storage device 1810, such as a magnetic disk, optical disk, or USB thumb drive (Flash drive), etc., is provided and coupled to bus 1802 for storing information and instructions.

The computer system 1800 may be coupled via bus 1802 to a display 1812, such as a liquid crystal display (LCD) (or touch screen), for displaying information to a computer user. An input device 1814, including alphanumeric and other keys, is coupled to bus 1802 for communicating information and command selections to processor 1804. Another type of user input device is cursor control 1816, such as a mouse, a trackball, or cursor direction keys for communicating direction information and command selections to processor 1804 and for controlling cursor movement on display 1812. In some embodiments, the same direction information and command selections as cursor control may be implemented via receiving touches on a touch screen without a cursor.

The computing system 1800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1800 may implement the techniques described herein using customized hard-wired logic, one or more ASICs or FPGAs, firmware and/or program logic which in combination with the computer system causes or programs computer system 1800 to be a special-purpose machine. According to one embodiment, the techniques herein are performed by computer system 1800 in response to processor(s) 1804 executing one or more sequences of one or more instructions contained in main memory 1806. Such instructions may be read into main memory 1806 from another storage medium, such as storage device 1810. Execution of the sequences of instructions contained in main memory 1806 causes processor(s) 1804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1810. Volatile media includes dynamic memory, such as main memory 1806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1802. Transmission media can also take the form of acoustic or light waves, such as those generated during radio-wave and infra-red data communications.

The computer system 1800 also includes an interface 1818 coupled to bus 1802. Interface 1818 provides a two-way data communication coupling to one or more network links that are connected to one or more local networks. For example, interface 1818 may be an integrated services digital network (ISDN) card, cable modem, satellite modem, or a modem to provide a data communication connection to a corresponding type of telephone line. As another example, interface 1818 may be a local area network (LAN) card to provide a data communication connection to a compatible LAN (or WAN component to communicated with a WAN).

Wireless links may also be implemented. In any such implementation, interface 1818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 1818, which carry the digital data to and from computer system 1800, are example forms of transmission media.

The computer system 1800 can send messages and receive data, including program code, through the network(s), network link and interface 1818. In the Internet example, a server might transmit a requested code for an application program through the Internet, the ISP, the local network and interface 1818.

The received code may be executed by processor 1804 as it is received, and/or stored in storage device 1810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAS, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 1800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A gateway device comprising:
   one or more processors; and
   a non-transitory storage medium storing instructions executable on the one or more processors to:
   monitor accessibility to a network from the gateway device via a physical uplink based on sending a first probe request at a first frequency, wherein the physical uplink comprises a wide area network (WAN) physical uplink;
   monitor accessibility to the network from the gateway device via a virtual uplink based on sending a second probe request at a second frequency that is different from the first frequency, wherein the first frequency corresponds to a first time interval, and the second frequency corresponds to a second time interval that is different from the first time interval, and the virtual uplink comprises a local area network (LAN) connection through a switch;
   based on receiving a response to the first probe request via the physical uplink and not receiving a response to the second probe request via the virtual uplink within a threshold period of time, mark a status of the physical uplink as reachable and a status of the virtual uplink as unreachable;
   use the physical uplink to maintain data transmissions to the network from the gateway device;
   suspend or stop connections via the virtual uplink to remove data transmissions to the network from the gateway device via the virtual uplink; and
   continue to monitor the accessibility to the network from the gateway device via the virtual uplink.

2. The gateway device of claim 1, wherein the gateway device is connected between the switch and the network, and the instructions are executable on the one or more processors to:
   send the second probe request from the gateway device through the switch and a further gateway device to the network.

3. The gateway device of claim 2, wherein the first probe request and the second probe request comprise Internet Control Message Protocol (ICMP) probes.

4. The gateway device of claim 2, wherein the first probe request and the second probe request comprise User Datagram Protocol (UDP) probes.

5. The gateway device of claim 2, wherein the physical uplink connects the gateway device to the network, and the virtual uplink connects the gateway device to the network through the switch and the further gateway device.

6. The gateway device of claim 1, wherein the status of the virtual uplink is marked as unreachable prior to completion of a WAN health check.

7. The gateway device of claim 1, wherein the second time interval is less than the first time interval.

8. The gateway device of claim 1, wherein the instructions are executable on the one or more processors to:
after suspending or stopping the connection via the virtual uplink, rebalance a load of the data transmissions without the virtual uplink.

9. The gateway device of claim 1, wherein the instructions are executable on the one or more processors to:
in response to receiving a heartbeat over the LAN connection, restore the virtual uplink.

10. A method of a gateway device, comprising:
monitoring accessibility to a network from the gateway device via a physical uplink based on sending a first probe request at a first frequency, wherein the physical uplink comprises a wide area network (WAN) physical uplink;
monitoring accessibility to the network from the gateway device via a virtual uplink based on sending a second probe request at a second frequency that is different from the first frequency, wherein the first frequency corresponds to a first time interval, and the second frequency corresponds to a second time interval that is different from the first time interval, and the virtual uplink comprises a local area network (LAN) connection through a switch;
based on receiving a response to the first probe request via the physical uplink and not receiving a response to the second probe request via the virtual uplink within a threshold period of time, marking a status of the physical uplink as reachable and a status of the virtual uplink as unreachable;
using, by the gateway device, the physical uplink to maintain data transmissions to the network from the gateway device;
suspending or stopping connections via the virtual uplink to remove data transmissions to the network from the gateway device via the virtual uplink; and
continuing to monitor the accessibility to the network from the gateway device via the virtual uplink.

11. The method of claim 10, wherein the gateway device is connected between the switch and the network.

12. The method of claim 11, wherein the first probe request and the second probe request comprise Internet Control Message Protocol (ICMP) probes.

13. The method of claim 11, wherein the first probe request and the second probe request comprise User Datagram Protocol (UDP) probes.

14. The method of claim 11, comprising:
sending the second probe request from the gateway device through the switch and a further gateway device to the network.

15. The method of claim 10, wherein the status of the virtual uplink is marked as unreachable prior to completion of a WAN health check.

16. The method of claim 10, wherein the second time interval is less than the first time interval.

17. The method of claim 10, further comprising:
after suspending or stopping the connection via the virtual uplink, rebalancing a load of the data transmissions without the virtual uplink.

18. A non-transitory computer-readable storage medium comprising instructions that upon execution cause a gateway device to:
monitor accessibility to a network from the gateway device via a physical uplink based on sending a first probe request at a first frequency, wherein the physical uplink comprises a wide area network (WAN) physical uplink;
monitor accessibility to the network from the gateway device via a virtual uplink based on sending a second probe request at a second frequency that is different from the first frequency, wherein the first frequency corresponds to a first time interval, and the second frequency corresponds to a second time interval that is different from the first time interval, and the virtual uplink comprises a local area network (LAN) connection through a switch;
based on receiving a response to the first probe request via the physical uplink and not receiving a response to the second probe request via the virtual uplink within a threshold period of time, mark a status of the physical uplink as reachable and a status of the virtual uplink as unreachable;
use the physical uplink to maintain data transmissions to the network from the gateway device;
suspend or stop connections via the virtual uplink to remove data transmissions to the network from the gateway device via the virtual uplink; and
continue to monitor the accessibility to the network from the gateway device via the virtual uplink.

19. The non-transitory computer-readable storage medium of claim 18, wherein the gateway device is connected between the switch and the network, and the instructions upon execution cause the gateway device to:
send the second probe request from the gateway device through the switch and a further gateway device to the network.

20. The non-transitory computer-readable storage medium of claim 19, wherein the physical uplink connects the gateway device to the network, and the virtual uplink connects the gateway device to the network through the switch and the further gateway device.

* * * * *